United States Patent
Hamdi et al.

(10) Patent No.: US 9,231,887 B2
(45) Date of Patent: Jan. 5, 2016

(54) HIGH-PERFORMANCE ROUTERS WITH MULTI-STAGE, MULTI-LAYER SWITCHING AND SINGLE-STAGE SHARED BUFFERING

(71) Applicant: The Hong Kong University of Science and Technology, Kowloon (HK)

(72) Inventors: Mounir Hamdi, Kowloon (HK); Feng Wang, Kowloon (HK)

(73) Assignee: DYNAMIC INVENTION LLC, Victoria Mahe (SC)

( * ) Notice: Subject to any disclaimer, the term of this patent is extended or adjusted under 35 U.S.C. 154(b) by 327 days.

(21) Appl. No.: 13/777,725

(22) Filed: Feb. 26, 2013

(65) Prior Publication Data

US 2014/0064269 A1 Mar. 6, 2014

Related U.S. Application Data

(60) Provisional application No. 61/697,236, filed on Sep. 5, 2012.

(51) Int. Cl.
*H04L 12/56* (2006.01)
*H04L 12/947* (2013.01)
*H04L 12/931* (2013.01)

(52) U.S. Cl.
CPC .............. *H04L 49/25* (2013.01); *H04L 49/60* (2013.01)

(58) Field of Classification Search
None
See application file for complete search history.

(56) References Cited

U.S. PATENT DOCUMENTS

| | | | |
|---|---|---|---|
| 6,721,271 B1* | 4/2004 | Beshai et al. | 370/232 |
| 7,212,524 B1* | 5/2007 | Sailor et | 370/370 |
| 7,693,142 B2* | 4/2010 | Beshai | 370/380 |
| 2005/0078667 A1* | 4/2005 | Brown | 370/388 |
| 2005/0207436 A1* | 9/2005 | Varma | 370/412 |
| 2006/0120379 A1* | 6/2006 | Beshai | 370/395.4 |
| 2006/0165070 A1* | 7/2006 | Hall et al. | 370/369 |
| 2006/0165112 A1* | 7/2006 | Varma | 370/428 |

OTHER PUBLICATIONS

Keslassy, et al., "Scaling Internet routers using optics," Proceedings of the 2003 conference on Applications, technologies, architectures, and protocols for computer communications, pp. 189-200, 2003.
Minkenberg, et al., "Current issues in packet switch design," ACM SIGCOMM Computer Communication Review, vol. 33, pp. 119-124, 2003.

(Continued)

*Primary Examiner* — Ian N Moore
*Assistant Examiner* — Lakeram Jangbahadur
(74) *Attorney, Agent, or Firm* — Amin, Turocy & Watson, LLP

(57) ABSTRACT

The subject specification comprises techniques employing multi-stage multi-layer switches for packet switching using fully shared buffers with a scalable switch fabric. A switch component includes a set of input modules (IMs) of switches that receive packets and are associated with a set of central modules (CMs) of switches that are associated with a set of memories. The switch component includes a second set of CMs associated with the set of memories, the second set of CMs being associated with a set of output modules (OMs) that can provide packets as output. A switch management component controls switching of the packets between the IMs and first set of CMs to the memories during a first switching phase, and switching of the packets from the memories to the second set of CMs to the OMs for output during a second switching phase, based on a defined scheduling algorithm.

26 Claims, 14 Drawing Sheets

(56) References Cited

OTHER PUBLICATIONS

Clos, "A study of Non-Blocking Switching Networks," Bell Systems Technical Journal, pp. 406-424, 1953.

McKeown, "The iSLIP scheduling algorithm for input-queued switches," Networking, IEEE/ACM Transactions on, vol. 7, pp. 188-201, 1999.

S. T. Chuang, A. Goel, N. McKeown, and B. Prabhakar, "Matching output queuing with a combined input output queued switch," IEEE Journal on Selected Areas in Communications, vol. 17, pp. 1030-1039, 1999.

Chaney, et al., "Design of a gigabit ATM switch," in Proceedings of IEEE INFOCOM, 1997.

F. M. Chiussi, J. G. Kneuer, and V. P. Kumar, "Low-cost scalable switching solutions for broadband networking: the Atlanta architecture and chipset," IEEE Communication Magazine, vol. 35, pp. 44-53, 1997.

Chao, et al., "Matching algorithms for three-stage bufferless Clos network switches," Communications Magazine, IEEE, vol. 41, pp. 46-54, 2003.

Chao, et al., "Centralized contention resolution schemes for a large-capacity optical ATM switch," in Proceedings of IEEE ATM workshop, 1998.

Iyer, et al., "Routers with a single stage of buffering," Proceedings of the 2002 SIGCOMM conference, vol. 32, pp. 251-264, 2002.

Aziz, et al., "A near optimal scheduler for switch-memory-switch routers," Proceedings of the fifteenth annual ACM symposium on Parallel algorithms and architectures, pp. 343-352, 2003.

Chang, et al., "Load balanced Birkhoff-von Neumann switches, part I: one-stage buffering," Computer Communications, vol. 25, pp. 611-622, 2002.

Chao, et al., Broadband Packet Switching Technologies: A Practical Guide to ATM Switches and IP Routers: John Wiley & Sons, Inc. New York, NY, USA, 2001.

Iyer, et al., "Analysis of a packet switch with memories running slower than the line rate," in Proceedings of IEEE Infocom, 2000.

Demers, S. Keshav, and S. Shenker, "Analysis and simulation of a fair queuing algorithm," Journal of Internetworking: Research and Experience, 1990.

Parekh, et al., "A generalized processor sharing approach to flow control in integrated services networks: the single node case," IEEE/ACM Transactions on Networking, vol. 1, pp. 344-357, 1993.

Li, et al. "The dual round robin matching switch with exhaustive service," High Performance Switching and Routing, 2002. Merging Optical and IP Technologies. Workshop on, pp. 58-63, 2002.

Chang, et al., "Birkhoff-von Neumann input buffered crossbar switches," in Proceedings of IEEE Infocom, 2000.

D. Konig, "Uber Graphen und ihre Anwedung auf Determinatentheorie und Mengenlehre," Math. Ann., vol. 77, pp. 453-465, 1916.

J. von Neumann, "A certain zero-sum two-person game equivalent to the optimal assignment problem," Contributions to the Theory of Games, vol. 2, pp. 5-12, 1953.

Chang, et al., "Load balanced Birkhoff-von Neumann switches, Part II: multi-stage buffering," Computer Communications, vol. 25, pp. 623-634, 2002.

Prakash, et al., "Randomized parallel schedulers for switch-memory-switch routers: Analysis and numerical studies," in IEEE INFOCOM, Mar. 2004.

Jaramillo, et al., "Padded Frames: A Novel Algorithm for Stable Scheduling in Load-Balanced Switches," Networking, IEEE/ACM Transactions on, vol. 16, No. 5, pp. 1212-1225, Oct. 2008.

Audzevich, et al., "Analysis of load-balanced switch with finite buffers," in IEEE GLOBECOM, pp. 1-6, New Orleans, LA, USA, 2008.

* cited by examiner

HIGH-PERFORMANCE ROUTERS WITH MULTI-STAGE, MULTI-LAYER SWITCHING AND SINGLE-STAGE SHARED BUFFERING

CROSS-REFERENCE TO RELATED APPLICATION AND CLAIM FOR PRIORITY

This application is a non-provisional of, and claims priority to, U.S. Provisional Patent Application No. 61/697,236, filed Sep. 5, 2012, and titled "HIGH-PERFORMANCE ROUTERS WITH MULTI-STAGE, MULTI-LAYER SWITCHING AND SINGLE-STAGE SHARED BUFFERING", which is hereby incorporated herein by reference in its entirety.

TECHNICAL FIELD

The disclosed subject matter generally relates to voice and data communications, and, more particularly, to high-performance routers with multi-stage, multi-layer switching and single-stage shared buffering.

BACKGROUND

Next generation networks (NGNs) facilitate communication of voice, data, media, etc., via packets of information (e.g., data packets) that can be transported through a communication network via a desired packet-related protocol(s) (e.g., an Internet protocol (IP), Voice over IP (VoIP), multi-protocol label switching (MPLS), session initiation protocol (SIP), etc.). One of the network components that can facilitate communicating packets across a network to their respective destinations (e.g., communication devices) is a router. A communication network can include a number of routers that can facilitate routing or directing respective packets to respective next destinations (e.g., a node, another router, a, etc.) towards their final destinations based at least in part on information associated with the respective packets.

Certain conventional routers that are built around a single-stage crossbar and a centralized scheduler do not scale, and (in practice) do not provide sufficient quality-of-service (QoS) guarantees. One deficiency with conventional routers for NGNs is router scalability. Router scalability can be translated into two dimensions: port speed scalability and port number scalability. Current routers can be required to scale on the number of ports, rather than port speed. The immediate reasons are twofold. First, the network line rates may be required to remain stable for a certain period of time to support an existing installed base of network line cards (e.g., operation carrier (OC)-192/768 line cards). Therefore, router port speed can increase discretely, not gradually. Second, dense wavelength division multiplexing (DWDM) can vastly increase the number of channels available on a single fiber, but not the speed of a single channel. At the router, this can translate into more ports at the same speed.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The disclosed subject matter can comprise a system that includes a memory to store computer-executable components; and a processor, coupled to the memory, that executes or facilitates execution of at least one of the computer-executable components. The computer-executable components comprise a switch component that comprises multiple stages of switches and intermediate-stage shared buffering of packets of information to facilitate communication of the packets in a communication network, wherein the switch component comprises an input component comprising a plurality of switches associated with an input stage of the multiple stages, an intermediate component comprising a plurality of switches associated with an intermediate stage of the multiple stages, and an output component comprising a plurality of switches associated with an output stage of the multiple stages. The computer-executable components also comprise a memory component that comprises a plurality of memory sub-components and is associated with the intermediate component of the intermediate stage, wherein memory sub-components of the plurality of memory sub-components are shared with the plurality of switches of the input component and the plurality of switches of the output component to facilitate buffering of the packets via the intermediate-stage shared buffering and scheduling of the packets for output from the switch component.

The disclosed subject matter also can include a method that comprises receiving, by a system comprising a processor, a plurality of packets of traffic at an input component comprising a plurality of switches and associated with an input stage of a multi-stage switch component. The method also comprises transmitting, by the system, a packet of the plurality of packets from a switch of the input component to a buffer memory of a plurality of buffer memories in an intermediate-stage shared buffer memory component via a communication link and a switch of a first intermediate module of an intermediate component, based at least in part on a matching of the buffer memory with the packet in accordance with a set of defined packet scheduling criterion, to facilitate buffering the packet in connection with a departure time associated with the packet, wherein the intermediate-stage shared buffer memory component and the intermediate component are associated with an intermediate stage of the multi-stage switch component. The method further comprises transmitting, by the system, the packet from the buffer memory to a switch of a plurality of switches of an output component via a switch of a second intermediate module of the intermediate component to facilitate providing the packet as an output from the multi-stage switch component based at least in part on the departure time associated with the packet, wherein the output component is associated with an output stage of the multi-stage switch component.

The disclosed subject matter further can comprise a system that includes means for receiving a plurality of packets of traffic at an input component comprising a plurality of switches and associated with an input stage of a multi-stage switch component. The system also comprises means for transmitting a packet of the plurality of packets from a switch of the input component to a buffer memory sub-component of a plurality of buffer memory sub-components in an intermediate-stage shared buffer memory component via a communication link and a switch of a first intermediate module of an intermediate component, based at least in part on a matching of the buffer memory sub-component with the packet in accordance with a set of defined packet scheduling criterion, to facilitate buffering the packet in connection with a departure time associated with the packet, wherein the intermediate-stage shared buffer memory component and the intermediate component are associated with an intermediate stage of the multi-stage switch component. The system further comprises means for transmitting the packet from the buffer memory sub-component to a switch of a plurality of switches of an output component via a switch of a second intermediate module of the intermediate component to facilitate providing the packet as an output from the multi-stage switch component based at least in part on the departure time associated with the packet, wherein the output component is associated with an output stage of the multi-stage switch component.

The tangible computer-readable medium storing instructions that, in response to execution, cause a system comprising a processor to perform operations. The operations comprise receiving a plurality of packets of information at an input component comprising a plurality of switches and associated with an input stage of a multi-stage switch component. The operations also comprise transmitting a packet of the plurality of packets from a switch of the input component to a buffer memory of a plurality of buffer memories in an intermediate-stage shared buffer memory component via a communication link and a switch of a first intermediate module of an intermediate component, based at least in part on a matching of the buffer memory with the packet in accordance with a set of defined packet scheduling criterion, to facilitate buffering the packet in connection with a departure time associated with the packet, wherein the intermediate-stage shared buffer memory component and the intermediate component are associated with an intermediate stage of the multi-stage switch component. The operations further comprise transmitting the packet from the buffer memory to a switch of a plurality of switches of an output component via a switch of a second intermediate module of the intermediate component to facilitate providing the packet as an output from the multi-stage switch component based at least in part on the departure time associated with the packet, wherein the output component is associated with an output stage of the multi-stage switch component.

To the accomplishment of the foregoing and related ends, the disclosed subject matter, then, comprises the features hereinafter fully described. The following description and the annexed drawings set forth in detail certain illustrative aspects of the disclosed subject matter. However, these aspects are indicative of but a few of the various ways in which the principles of the disclosed subject matter may be employed. Other aspects, advantages and novel features of the disclosed subject matter will become apparent from the following detailed description of the disclosed subject matter when considered in conjunction with the drawings.

DETAILED DESCRIPTION

Figure 1:
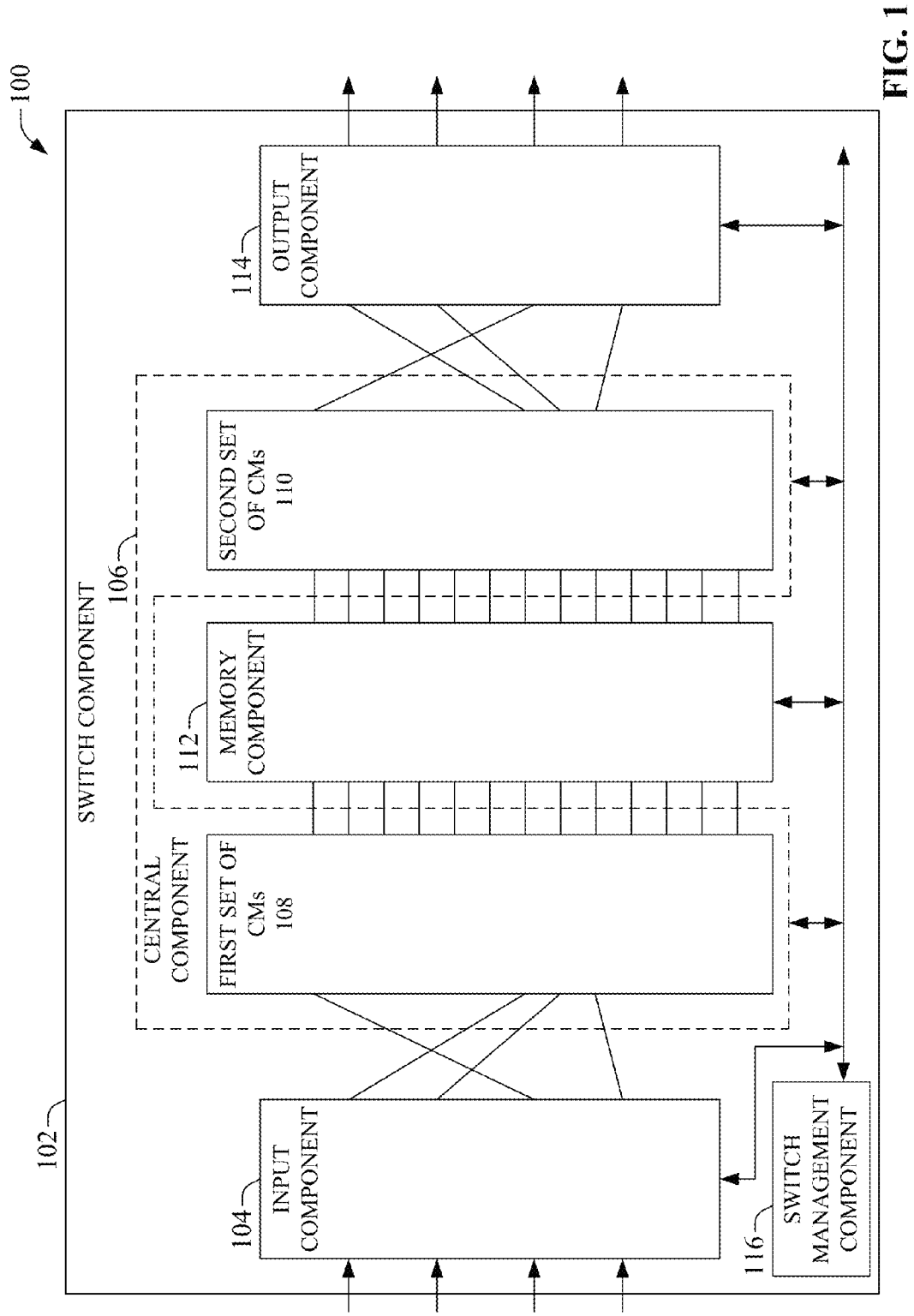
FIG. 1 illustrates a block diagram of an example system that can facilitate processing packets of information, in accordance with various aspects and embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Next generation networks (NGNs) facilitate communication of voice, data, media, etc., via packets of information (e.g., data packets) that can be transported through a communication network via a desired packet-related protocol(s) (e.g., an Internet protocol (IP), Voice over IP (VoIP), multi-protocol label switching (MPLS), session initiation protocol (SIP), etc.). One of the network components that can facilitate communicating packets across a network to their respective destinations (e.g., communication devices) is a router. A communication network can include a number of routers that can facilitate routing or directing respective packets to respective next destinations (e.g., a node, another router, a, etc.) towards their final destinations based at least in part on information associated with the respective packets.

Certain conventional routers that are built around a single-stage crossbar and a centralized scheduler do not scale, and (in practice) do not provide sufficient quality-of-service (QoS) guarantees. One deficiency with conventional routers for NGNs is router scalability. Router scalability can be translated into two dimensions: port speed scalability and port number scalability. Current routers can be required to scale on the number of ports, rather than port speed. The immediate reasons are twofold. First, the network line rates may be required to remain stable for a certain period of time to support an existing installed base of network line cards (e.g., operation carrier (OC)-192/768 line cards). Therefore, router port speed can increase discretely, not gradually. Second, dense wavelength division multiplexing (DWDM) can vastly increase the number of channels available on a single fiber, but not the speed of a single channel. At the router, this can translate into more ports at the same speed.

With circuit switching, multi-stage multi-layer switching can be employed to facilitate establishing connections. Multi-stage multi-layer switching also can be employed with routers for use in packet switching in communication networks. A multi-stage multi-layer switching core can offer certain advantages, such as, for example, hardware cost efficiency, modular design, lower power density, and so on, which can be more preferred by network operators. While circuit switches typically can be responsible for establishing connections, buffers can be desired (e.g., preferred, required, etc.) for use in relation to packet switches and the switching or placing of packets in communication networks, not only for contention resolving, but for desired QoS processing as well.

The placement and use of buffers in the multi-stage multi-layer switches for routers has varied in conventional devices. In the single-stage crossbar, buffering has only two choices: in the input side and/or in the output side. Therefore, single-stage packet switches can be categorized into input-queued (IQ) switch, output-queued (OQ) switch, and combined-input-output-queued (CIOQ) switch, according to the internal speedup the switch fabric employs. There also have been theories on the use the CIOQ crossbar switches with virtual-output-queuing (VOQ) techniques. While there have been some variations in conventional techniques and devices, many conventionally proposed techniques mainly buffer packets in the input side of the router. Packet scheduling from the input VOQs to the central buffers can employ similar paradigms that exist in the CIOQ switches, such as switches using iSLIP or dual round-robin matching (DRRM). Although this strategy may adopt some scheduling algorithms and results from existing single-stage CIOQ switches, it also can inherit their insufficiency in providing QoS guarantees.

One reason behind the single-stage crossbar's limitation to provide QoS is that the buffers may not be efficiently shared if we put the majority of buffers in the input side. It can be seen that each buffer is dedicated for only one input and is not able to be shared with other inputs. Due to this underlying constraint, high capacity routers and QoS researches are being nearly mutually exclusively developed.

In addition, poor sharing ability in the input side also can affect the total amount of buffers to be used with a router to absorb bursty traffic. Due to the bursty characteristic of data communications, it can be desirable to have buffers in all input ports sized to hold the worst-case traffic jam that may only happen in one input port during a specific time period. This may require a relatively large amount of memories when manufacturing routers with a relatively large number of switch ports.

To that end, the disclosed subject matter comprises techniques that can employ multi-stage multi-layer switches for packet switching using fully shared buffers with a scalable switch fabric. These switches can be employed in one or more scalable routers that can be used in a communication network.

The disclosed subject matter can include a switch component, which can be or can include a multi-stage multi-layer switching and single-stage shared buffering (MMS-SSB) switch. The switch component can include a set of input modules (IMs) of switches (e.g., switch sub-components) that can receive packets, wherein the set of IMs can be associated with a first set of central modules (CMs) of switches (e.g., a first set of intermediate modules of switches) that can be associated with a set of memories (e.g., memory sub-components of a memory component) and interposed between the set of IMs and the set of memories. The switch component also can include a second set of CMs of switches (e.g., a second set of intermediate modules of switches) that can be associated with the set of memories (e.g., the outputs of the respective memories), and the second set of CMs also can be associated with a set of output modules (OMs) that can provide the packets as an output. The first set of CMs and second set of CMs can be part of a central component (e.g., intermediate component). The switch component can include a switch management component (e.g., a unitary switch management component, or a distributed, shared, and/or decentralized switch management component(s) (e.g., switch management component(s) or sub-component(s)) that can be part of or associated with various components of the switch component and can facilitate controlling switching of the packets between the IMs and first set of CMs to the memories (e.g., shared buffers) during a first switching phase and switching of the packets from the memories to the second set of CMs and to the OMs for output during a second switching phase, in accordance with a defined scheduling algorithm. As more fully disclosed herein, a defined scheduling algorithm can be, for example, a request-grant, request-grant (RGRG) algorithm (e.g., to facilitate emulating a first-come-first-served (FCFS)-OQ switch) or a modified scheduling algorithm that can be based at least in part on the RGRG algorithm (e.g., to facilitate emulating an OQ switch with desired QoS guarantees). In some implementations (e.g., when employing the modified scheduling algorithm), the OMs can include a set of buffers (e.g., buffer components) that can be respectively associated with the inputs of the switches of the set of OMs to facilitate employing the defined modified scheduling algorithm to process (e.g., schedule, switch out, etc.) packets in accordance with desired (e.g., acceptable) Quality of Service (QoS) standards (e.g., standards or requirements), as more fully disclosed herein.

The disclosed subject matter can structure the buffers (e.g., buffers or memory sub-components of the memory component) of the switch component so that the buffers can be shared (e.g., fully shared) by the IMs of the input component of the input stage (e.g., the first stage) and the OMs of the output component of the output stage (e.g., third stage). This can provide benefits from hardware costs and QoS considerations, as the switch component can be more cost efficient from a hardware standpoint and can achieve a desired QoS (e.g., can meet desired QoS requirements). The disclosed subject matter can use internal speedup, as desired, wherein, for example, when the speedup is N (with N being a desired integer number), buffers associated with the output side can be regarded as being fully shared. Also, the multi-stage architecture of the switch component can provide additional flexibility to facilitate buffering packets being processed by the switch component.

The switch component can employ fully shareable buffers (e.g., memory sub-components) that can facilitate buffering packets in the central stage, wherein the switch component can be structured with no buffering in the input side (e.g., at the input side of the set of IMs), wherein the buffers can be shared immediately or substantially immediately. The switch component can be a multi-stage switching network, wherein central buffers can be fully shared by all input and output ports of the set of IMs and set of OMs, respectively. The central buffers of the switch component can be shared in a distributed way in relation to the input ports and output ports, and the central buffers can operate at the line rate for the switching system of the switch component.

In some implementations, the switch component can be configured to emulate an OQ switch that can be regarded as having a desirable (e.g., preferable, optimal, etc.) throughput-delay performance. For instance, the switch component can be configured to emulate an FCFS-OQ switch and/or a general OQ switch, such as a push-in-first-out (PIFO) queue, with QoS support.

The expansion of conventional routers can have a number of scalability issues, wherein scalability typically can be described in terms of the switch size N. Some of the scalability issues can include, for example, hardware cost, use of scheduling algorithms, and traffic independency. With regard to hardware cost, for example, a single-stage crossbar generally can be regarded as non-scalable due in part to its relatively high hardware complexity of $O(N^2)$. With regard to scheduling algorithms, it can be desirable for a router to be able to employ desired (e.g., efficient, practical, preferred, optimal, etc.) scheduling algorithms. Normally the linear complexity $O(N)$ can be deemed un-scalable. $O(\log N)$ complexity can be acceptable, but still can scale relatively easily beyond the practical considerations.

In accordance with various aspects of the disclosed subject matter, the switch component (e.g., MMS-SSB switch) can be efficiently scalable, as more fully described herein. Also, with regard to traffic independency, the switch component can be traffic independent, which can facilitate improving (e.g., optimizing) the defined scheduling algorithms and the hardware costs of the switch component.

The above aspects and other aspects of the disclosed subject matter are described with regard to the figures.

Referring to the drawings, FIG. 1 illustrates a block diagram of an example system 100 that can facilitate processing (e.g., scheduling, switching, communicating, routing, etc.) packets of information, in accordance with various aspects and embodiments of the disclosed subject matter. In an aspect, the system 100 can comprise a switch component 102 that can receive packets of information and can control the switching, communication, or other processing of the packets of information, in accordance with a defined scheduling algorithm(s). In some implementations, the switch component 102 can be or can comprise a multi-stage multi-layer switching and single-stage shared buffering (MMS-SSB) switch. The switch component 102 can provide the packets as an output for communication (e.g., transmission to another component or device (e.g., a network device or component in a communication network, a communication device, etc.)). The switch component 102 can be, for example, part of one or more routers (e.g., scalable routers) associated with a communication network.

The switch component 102 can include an input component 104 that can comprise a set of input modules (IMs) that can receive packets from a device or component (e.g., a network device or component, a communication device, etc.) associated with the communication network, wherein the set of IMs can include k IMs that each can be or can include a switch, such as an n×m switch, and wherein k, n, and m, can be respective integer numbers having respectively desired values.

The input component 104 can be associated with (e.g., communicatively connected to) a central component 106 (e.g., intermediate component) that can include a first set of central modules (CMs) 108 (e.g., a first set of intermediate modules of switches) and a second set of CMs 110 (e.g., a second set of intermediate modules of switches). For each of the first set of CMs 108 and second set of CMs 110, there can be, for example, m CMs, and respective CMs of the central component 106 can be or can include, for example, k×k switches. It is to be appreciated and understood that, while throughout this disclosure reference is made to a central component, central modules, central-stage, central-stage buffering, etc., in accordance with various aspects and implementations of the disclosed subject matter, a central component, central modules, central stage, central-stage buffering, etc., is not necessarily physically or logically located in the center of a system, device, component, etc., and can be physically or logically located in other regions of a system, device, component, etc. For at least purposes of this disclosure, the term "central" can mean or relate to, for example, central or intermediate and/or can relate to, for example, a component (e.g., a central or intermediate component (or module)) that can be interposed physically and/or logically between at least two other components (or modules).

The switch component 102 also can include a memory component 112 that can be interposed between the first set of CMs 108 of the central component 106 and the second set of CMs 110 of the central component 106, wherein the first set of CMs 108, the memory component 112, and the second set of CMs can be part of the central stage of the multi-stage switch component 102. The respective outputs (e.g., output ports) of the first set of CMs 108 can be associated with (e.g., communicatively connected to) respective inputs (e.g., input ports) of respective memories (e.g., memory sub-components or memory buffers) of the memory component 112, and the respective outputs (e.g., output ports) of the respective memories can be associated with (e.g., communicatively connected to) respective inputs (e.g., input ports) of the second set of CMs 110 of the central component 106.

The switch component 102 can further include an output component 114 that can be associated with (e.g., communicatively connected to) the central component 106 (e.g., the outputs of the respective CMs of the second set of CMs 110 of the central component 106). The output component 114 can include a set of output modules (OMs), such as a desired number (k) OMs that can include switches, such as m×n switches, which can facilitate switching out, communicating, routing, and/or otherwise processing packets. The output component 114 can provide packets as an output (e.g., from respective output ports of respective switches of the output component 114).

The switch component 102 can comprise a switch management component 116 that can control operations associated with the switch component 102. The switch management component 116 can be associated with (e.g., communicatively connected to, part of, etc.) the input component 104, the central component 106, the memory component 112, and/or the output component 114 to facilitate controlling operations (e.g., controlling the switching or processing of packets) associated with the switch component 102. The switch management component 116 and other components of the switch component 102 can employ a defined scheduling algorithm(s) (e.g., RGRG algorithm, a defined modified scheduling algorithm based at least in part on the RGRG algorithm, etc.) to facilitate processing packets, switching packets, communicating packets, etc., to facilitate receiving packets at the input component 104 and providing the packets as an output from the output component 114 for further processing (e.g., distribution or transmission to a next destination or final destination).

When packets are received by the switch component 102, the switch management component 116 can control operations of the input component 104, the central component 106, and the memory component 112 to dispatch or write the packets to respective memory sub-components (e.g., buffer components (e.g., memory buffers) of the memory component 112 during a first switching phase, wherein the respective packets traverse the input component 104 to the first set of CMs 108 to the respective memory sub-components of the memory component 112, in accordance with the defined scheduling algorithm. The memory sub-components can be shared (e.g., fully shared) by the respective switches (e.g., switch sub-components) of the IMs and the OMs. There can be IM-CM links (ICLs), which can be communication links, that can facilitate communication of packets from respective switches of the IMs of the input component 104 to respective switches of the CMs of the first set of CMs 108 in the central component 106. The switch management component 116 can facilitate controlling the flow of the packets and operations of the input component 104, central component 106, and the memory component 112 to have respective memory sub-components of the memory component 112 selected for or assigned to (e.g., randomly selected for or assigned to) respective ICLs, and have the respective memory sub-components use the respective ICLs to request the packets (e.g., compatible packets) from the respective switches in the IMs of the input component 104, wherein the respective memory sub-components can be selected for or assigned to (e.g., randomly selected for or assigned to) respective compatible packets and the respective compatible packets can be transferred to the respective memory sub-components of the memory component 112 via the respective ICLs and respective switches of the first set of CMs 108 of the central component 106, in accordance with the defined scheduling algorithm.

Each of the packets can have respective departure times, wherein a departure time associated with a packet can be a time (e.g., time slot) at which that packet is scheduled to be switched out of the switch component 102 (e.g., read from the memory sub-component and switched out via the assigned switch of the output component 114). The switch management component 116 or another component (e.g., input component 104) of the switch component 102 typically can assign packets their respective departure times as the packets are received by the input component 104, in accordance with the arrival order of the packets. However, in some implementations, such as implementations involving prioritized service disciplines, the switch management component 116 or another component (e.g., input component 104) of the switch component 102 can modify departure times of packets based at least in part on the respective priority levels of respective packets (or based at least in part on one or more other defined scheduling or dispatching criterion), wherein a first packet with a higher level of priority can be assigned an earlier departure time than a second packet with a lower level of priority relative to that of the first packet, even though the first packet was received by the input component 104 after the second packet was received by the input component 104.

During the second switching phase, the switch management component 116 can facilitate controlling operations of the memory component 112, central component 106 (e.g., the second set of CMs 110 of the central component 106), and the output component 114 to facilitate switching out the respective packets from the memory sub-components of the memory component 112 at their respective departure times via respective switches of the OMs of the output component 114, in accordance with the defined scheduling algorithm. At the defined departure time (e.g., time slot), a switch of a CM in the second set of CMs 110 can read or receive a packet from the memory sub-component of the memory component 112 in which the packet was stored, wherein the switch of the CM can correspond to and be communicatively connected to that memory sub-component in the switch component 102. The switch of the CM of the second set of CMs 110 can switch out the packet and communicate or transfer the packet to the assigned switch of an OM of the output component 114 via an assigned communication link. In some implementations, the assigned communication link can be a link that can correspond to (e.g., mirror) the communication link (e.g., ICL) that was used to transfer the packet from the switch of the IM of the input component 104 to the switch of the first set of CMs 108 of the central component 106. The switch of the OM of the output component 114 can switch out the packet to provide the packet as an output from the switch component 102 at the departure time.

Further description of these and other aspects of the disclosed subject matter, including that of the switch component and the defined scheduling algorithms, are provided in relation to the descriptions regarding the other figures or are otherwise disclosed herein.

Figure 2:
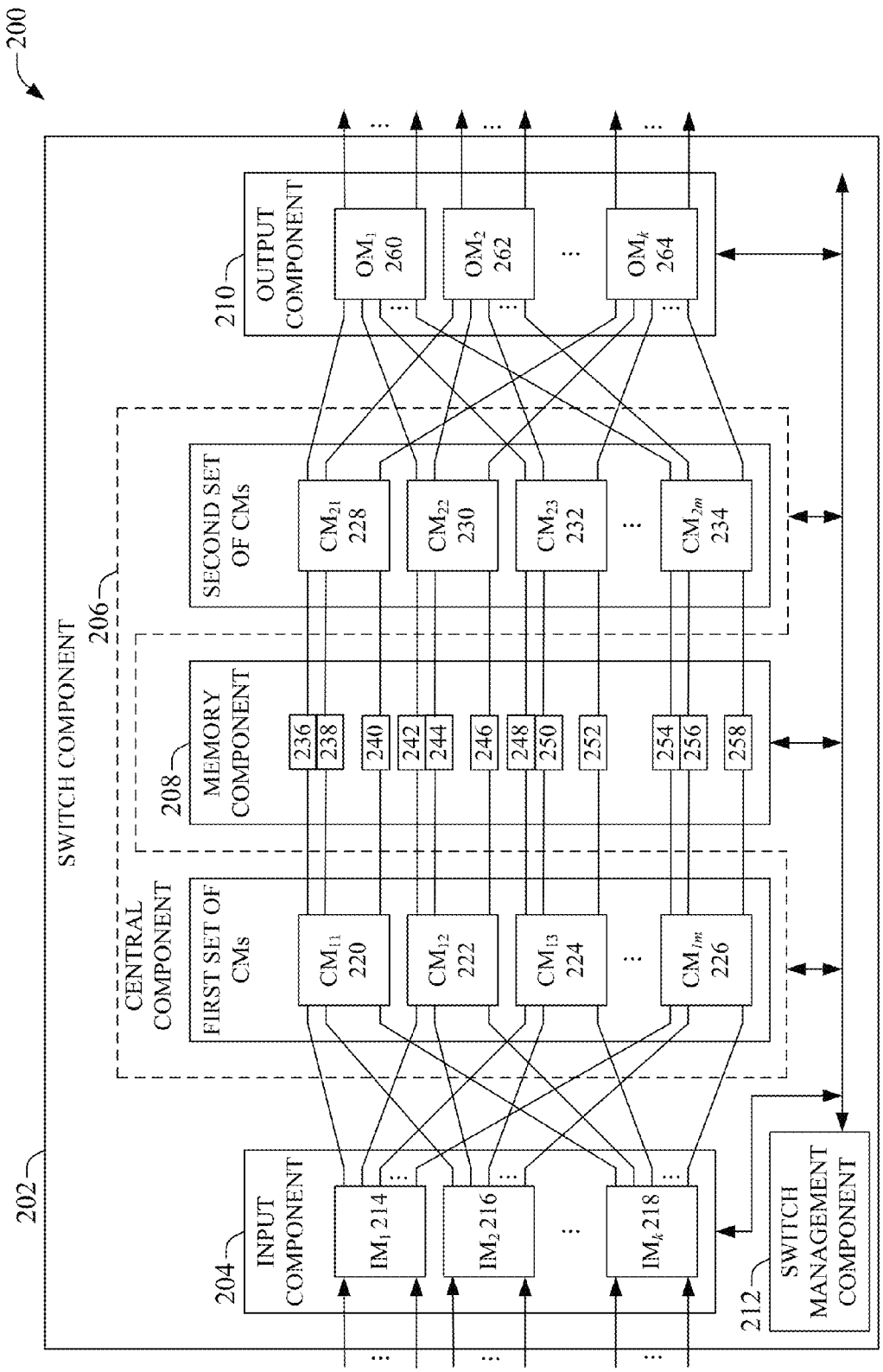
FIG. 2 illustrates a block diagram of another example system that can facilitate processing packets of information, in accordance with various aspects and embodiments of the disclosed subject matter.

FIG. 2 illustrates a block diagram of another example system 200 that can facilitate processing (e.g., scheduling, switching, communicating, routing, etc.) packets of information, in accordance with various aspects and embodiments of the disclosed subject matter. The system 200 can comprise a switch component 202 that can receive packets of information and can control the scheduling, switching, communication, dispatching, routing, or other processing of the packets of information, in accordance with a defined scheduling algorithm(s). In some implementations, the switch component 202 can be or can comprise an MMS-SSB switch.

The switch component 202 can provide the packets as an output for communication (e.g., transmission to another component or device (e.g., a network device or component in a communication network, a communication device, etc.)). The switch component 202 can be, for example, part of one or more routers (e.g., scalable routers) associated with a communication network (e.g., an NGN-type communication network). The switch component 202 can include an input component 204, a central component 206, a memory component 208, an output component 210, and a switch management component 212, each of which respectively can be the same as or similar to, and/or can comprise the same or similar functionality as, respective components (e.g., respectively named components), as disclosed herein.

The input component 204 can comprise a set of IMs, including $IM_1$ 214, $IM_2$ 216, up through $IM_k$ 218, that can receive packets from a device or component (e.g., a network device or component, a communication device, etc.) associated with the communication network, wherein the set of IMs can include k IMs that each can be or can include a switch, such as an n×m switch, and wherein k, n, and m, can be respective integer numbers having respectively desired values. Each IM (e.g., 214, 216, 218) of the set of IMs can include n input ports that each can receive packets via a communication connection (e.g., link), and m output ports that can provide or output packets to a next destination via a communication connection.

The input component 204 can be associated with (e.g., communicatively connected to) the central component 206 that can include a first set of CMs and a second set of CMs. The first set of CMs can include m CMs, including $CM_{11}$ 220, $CM_{12}$ 222, $CM_{13}$ 224, up through $CM_{1m}$ 226, and the second set of CMs can include m CMs, including $CM_{21}$ 228, $CM_{22}$ 230, $CM_{23}$ 232, up through $CM_{2m}$ 234, and respective CMs (e.g., 220 through 234) of the central component 206 can be or can include, for example, k×k switches. Each CM (e.g., 220 through 234) of the central component 206 can include k input ports that each can be capable of receiving packets via a communication connection (e.g., link) from an output port of an IM of the input component 204, and k output ports that can provide or output packets to memory sub-components of the memory component 208 via a communication connection or link (e.g., ICL).

The memory component 208 that can be interposed (e.g., in relation to communication of packets) between the first set of CMs (e.g., 220 through 226) of the central component 206 and the second set of CMs (e.g., 228 through 234) of the central component 206, wherein the respective outputs (e.g., output ports) of the first set of CMs can be associated with (e.g., communicatively connected to) respective inputs (e.g., input ports) of respective memory sub-components (e.g., memory sub-components 236, 238, 240, 242, 244, 246, 248, 250, 252, 254, 256, and 258) of the memory component 208, and the respective outputs (e.g., output ports) of the respective memory sub-components can be associated with (e.g., communicatively connected to) respective inputs (e.g., input ports) of the second set of CMs of the central component 206. The memory sub-components (e.g., 236, 238, 240, 242, 244, 246, 248, 250, 252, 254, 256, 258) can be memory buffers that can be shared (e.g., fully shared) by the respective switches (e.g., switch sub-components) of the IMs (e.g., 214, 216, 218) and the OMs (e.g., 260, 262, 264).

The output component 210 can be associated with (e.g., communicatively connected to) the central component 206 (e.g., the outputs of the respective CMs of the second set of CMs of the central component 206). The output component 210 can include a set of OMs, including $OM_1$ 260, $OM_2$ 262, up through $OM_k$ 264, that each can include a defined number of switches, such as m×n switches, which can facilitate switching out, communicating, routing, and/or otherwise processing packets associated with the switch component 202. Each OM (e.g., 260, 262, 264) of the set of OMs can include m input ports that each can receive packets via a communication connection (e.g., link) with respective memory sub-components of the memory component 208, and n output ports that can provide or output packets to a next or final destination via a communication connection with the next or final destination.

The switch management component 212 can control operations associated with the switch component 202. The switch management component 212 can be associated with (e.g., communicatively connected to) the input component 204, the central component 206, the memory component 208, and/or the output component 210 to facilitate controlling operations (e.g., controlling the switching or processing of packets) associated with the switch component 202. The switch management component 212 can employ a defined scheduling algorithm(s) (e.g., RGRG algorithm, modified scheduling algorithm, etc.) to facilitate processing packets, switching packets, communicating packets, etc., to facilitate receiving packets at the input component 204 and providing the packets as an output from the output component 210 for further processing (e.g., distribution or transmission to a next destination or final destination).

The switch component 202 can be configured in a number of different ways. In some implementations, the switch component 202 can be configured to have a multi-stage (e.g., 3 stage) network that can be employed to facilitate constructing the scalable packet switches. Such configuration of the switch component 202 can be useful because the multi-stage network has relatively few stages such that buffers can be clearly integrated into it, and the multi-stage network can be modular based, which can be more practical for operators to scale their routers gradually, as desired. One property that the multi-stage network (e.g., symmetrical or at least substantially symmetrical multi-stage network) can have is that there is one and only one link connecting modules in adjacent stages. The multi-stage network can be strictly non-blocking with a hardware complexity of $O(N^{1.5})$, where N is the number of inputs (e.g., number of inputs of the switch component 202 that are available to receive packets).

In contrast to some conventional switches, which employ input-side buffering, the switch component 202 does not use input-side buffering. Instead, the switch component 202 can be or can comprise an MMS-SSB switch that can use central buffering. In the architecture of the switch component 202, the central-stage buffers (e.g., the memory sub-components) of the memory component 208 can be fully shared. That is, all inputs of the input component 204 and all outputs of the output component 210 can have access to each buffer (e.g., each memory sub-component) in the memory component 208. This can be achieved by splitting the central stage modules into two copies, comprising the first set of CMs and the second set of CMs, respectively. As disclosed, the hardware complexity can be $O(N^{1.5})$.

In the switch component 202, the input component 204 and first set of CMs of the central component 206, to the left of the memory component 208 in FIG. 2, can be used as part of the first switching phase of the switch component 202, and the second set of CMs of the central component 206 and the output component 210, to the right of the memory component 208, can be used as part of the second switching phase of the switch component 202, wherein the components that are part of the first switching phase can be symmetrical or at least substantially symmetrical to the components that are part of the second switching phase. Accordingly, the defined packet scheduling algorithms for the switch component 202 can be divided into two phases, the first switching phase and the second switching phase. A packet can traverse the switch component 202 by being written into a memory sub-component of the memory component 208 via the first switching phase after its arrival at the input component 204. When it is time for the packet to depart (e.g., at departure time), the switch component 202 can read the packet from the memory sub-component and can switch out the packet from the output component 210 via the second switching phase.

In accordance with the disclosed subject matter, the switch component 202 can comprise the set (e.g., k) of IMs, including $IM_1$ 214, $IM_2$ 216, up through $IM_k$ 218, each of which can be or can comprise an n×m switch. The switch component 202 also can include two sets of CMs (e.g., two copies of CMs), the first set (e.g., m) of CMs (e.g., 220 through 226) of the central component 206 and the second set (e.g., m) of CMs (e.g., 228 through 234), each of which can be or can comprise a k×k switch. The number of independent memories (M) (e.g., memory sub-components) that can link the two sets of CMs can be M=mk in total. The switch component 202 also can comprise a set (e.g., k) OMs, including $OM_1$ 260, $OM_2$ 262, up through $OM_k$ 264, each of which can be an m×n switch. In some implementations, each pair of IM and CM (e.g., of the first set of CMs), and each pair of CM (e.g., of the second set of CMs) and OM, respectively, can be connected by a single link. The switch component 202 can include a total of N inputs (e.g., input ports) and N outputs (e.g., output ports), wherein N=nk.

One rationale for using two sets of CMs (e.g., $CM_{11}$ 220 through $CM_{1m}$ 226 in the first set, and $CM_{21}$ 228 through $CM_{2m}$ 234 in the second set) for the switch component 202 is to facilitate enabling the CMs to be fully shared among all the inputs and outputs of the switch component 202. Otherwise, if only one set of CMs were used, e.g. missing all the CMs in the first switching phase, then every memory may not be accessible by all of the inputs of the switch component, and this may result in inefficient use of all the memories of the switch component.

The switch component 202 also can be strictly symmetric (or at least substantially strictly symmetric), wherein strictly symmetric can mean that the architecture of the switch component 202 can be foldered along the buffer memory stage, wherein the second switching phase of the switch component 202 can use the same or substantially the same hardware as that of the first switching phase of the switch component 202. This can be a useful practice in implementation because in reality the input ports and output ports typically can be on the same line cards.

In some implementations, the switch component 202 can be configured to emulate and/or operate in a same or similar manner as a first-come-first-served (FCFS)-OQ switch. The switch component 202 also can employ an efficient defined packet scheduling algorithm, which can be scalable and independent of traffic pattern.

To facilitate description of the switch component (e.g., switch component 202 or other embodiments of the switch component), certain aspects, assumptions, and terms can be described and/or defined. With regard to the switch component, the fixed-length packet concept can be adopted, and it can be assumed that all packets are of the same length. This is common practice in high performance routers; and variable length packets typically can be segmented as they arrive, carried across a switch as fixed-length packets, and reassembled back into original packets before they depart.

Time Slot—Time slot can refer to the amount of time taken to transmit or receive a packet at the line rate R. It can be assumed that in every time slot, there can be at most one packet arriving at each input port and at most one packet departing from each output port.

Departure time—Departure time can refer to the time slot a packet is scheduled to leave the switch system. The departure time can be assigned to the packet (e.g., by a switch component) according to its arrival order and normally is not changed in the future if all packets are scheduled in an FCFS manner. In prioritized service disciplines, a switch component can change a departure time of a packet due to an arriving packet having a higher priority relative to another packet.

Output-queued (OQ) switch—An OQ switch can be a switch in which arriving packets can be placed immediately in queues at the outputs (e.g., output ports of the switch), wherein the packets can contend with packets destined to the same output waiting for their turns to depart the switch. One characteristic of an OQ switch is that the buffer memory has be capable of accepting (writing) N new packets and reading one packet per time slot, wherein N is the switch size. Hence, the memory typically can operate at N+1 times the line rate.

OQ switch emulation—With regard to OQ switch emulation, for a packet switching system, if the real departure time of packets through a switch is identical with that from the shadow OQ switch fed with the same incoming traffic, it can be determined or deemed that this packet switching system emulates an OQ switch.

A Push-In-First-Out (PIFO) queue—A PIFO queue can be defined according to the following rules: (1) arriving packets can be placed at (or pushed in) an arbitrary location in the queue; (2) the relative order of packets in the queue does not change once packets are in the queue, e.g., packets in the queue are not able to switch places with each other; and (3) packets may be selected to depart from the queue only from the head. PIFO queues can be quite general and can be used to implement various QoS scheduling disciplines such as weighted fair queuing (WFQ), generalized processor sharing (GPS) queuing, or strict queuing priorities.

When doing emulation, it can be assumed that there is no speedup in the switch component, which means that in one time slot one link can transfer one packet and one memory can support one read and write. Due to this constraint, compatibility can be defined as follows.

Compatibility—with regard to compatibility, for an incoming packet A and a memory B (e.g., memory sub-component B) of the switch component (e.g., 202), with incoming packet A's departure time being time t and the memory B associated with (e.g., linked to) a CM M of the switch component (e.g., 202), the memory B can be compatible with packet A, if the following conditions hold:

1. memory B does not contain packets whose departure time is time t; and 2. if there are packets that bear the departure time t in other memories linking with CM M, these packets do not request the same OM as the OM that packet A requests.

In the switch component (e.g., 202), to emulate an FCFS-OQ switch, each packet can be written into one of its compatible memories (e.g., compatible memory sub-components) in the of the memory component 208 via the first switching phase. The compatibility factor can be integral with regard to facilitating the ease of the second switching phase of the switch component (e.g., 202). The first condition can guarantee that at most one packet can be read to the memory B at time t. The second condition can guarantee that, for one link between the CM and the OM, at most one packet will traverse it at time t. It can be seen that, if all packets are written into the memories under this compatibility constraint, switching out the packets during the second switching phase is facilitated (e.g., typically not problematic), since the compatibility constraint can remove contentions (e.g., all contentions) among the packets waiting in the memories (e.g., memory sub-components) of the switch component (e.g., 202).

With regard to an FCFS-OQ switch and/or when emulating an FCFS-OQ switch, the switch component (e.g., 202) can assign a packet its departure time at the arrival of the packet to the switch component, and the switch component can switch out the packet from the switch component at that departure time. To emulate an FCFS-OQ switch, the switch component (e.g., 202) can guarantee every incoming packet at least one compatible memory sub-component (e.g., of the memory component 208) to be written in, regardless of the order or pattern of the arrival of the packets to the switch component. The following theorem provides the memory requirement condition.

Theorem 1: The switch component, such as switch component 202 (e.g., MMS-SSB switch), can emulate an FCFS-OQ switch without internal speedup, if the number of memories (M) in the central stage is M≥(2n−1)(2k−1).

Proof: Each arriving packet at an input port of the IM (e.g., $IM_1$ 214, $IM_2$ 216, or $IM_k$ 218) of the switch component (e.g., 202) can face two types of conflicts.

The first type of conflict can be referred to as arrival conflict. Packets arriving to the switch component (e.g., 202) at the same time slot cannot be written into the same memory (e.g. memory sub-component of the memory component). Interconnections in the switch component potentially can make arrival conflicts more elaborate. Arrival conflicts can be further divided into two kinds of conflicts. Consider an arbitrary packet A arriving at one of the k IMs of the input component (e.g., 204). For other packets arriving at the same IM of the switch component as packet A, there can be at most n−1 of this kind of packet, and these packets can occupy at most n−1 CMs (e.g., in the first set of CMs), wherein packet A is not able to traverse, or be switched or stored, because there is only one link (e.g., communication link or connection) between each pair of the IM and the CM. Thus, they can make up to (n−1)k memories unavailable to packet A at most. For packets arriving at other IMs of the input component, other than packet A, they can make up to n(k−1) memories (e.g. memory sub-components of the memory component) unavailable. Summing them up, there can be at most (n−1)k+(k−1)n memories (e.g. memory sub-components of the memory component) in total into which packet A cannot be placed due to the arrival conflict.

The second type of conflict can be referred to as the departure conflict. Packets bearing the same departure time cannot be written into the same memory (e.g. memory sub-component of the memory component); otherwise, there may be more than one read to a memory (e.g. memory sub-component of the memory component) at that time. A departure conflict can also be further divided into two types of conflicts. Consider the same packet A as above and another packet, referred to as packet B, which can bear the same departure time and to an output in packet A's destined OM. Packet A cannot be placed into the CM where packet B resides because packet A and packet B cannot use the same link between the CM and the OM in the same future time. There can be at most n−1 B kind packets, which can make up to (n−1)k memories unavailable to packet A. For packets destined to other OMs (e.g., switch sub-components of the other OMs), these packets can take up to (e.g., occupy or potentially occupy up to) n(k−1) memories. Summing them up, there can be at most (n−1)k+n(k−1) memories (e.g., memory sub-components of the memory component) in total into which packet A cannot be placed due to the departure conflict.

Therefore, using what is referred to as the pigeonhole principle, the number of memories M (e.g., memory sub-components of the memory component) in the central stage follows:

$$M \geq 2[(n-1)k + n(k-1)] + 1$$
$$= 4nk - 2k - 2n + 1$$
$$= (2n-1)(2k-1)$$

Corollary 1: The switch component, such as switch component 202 (e.g., MMS-SSB switch), can emulate an FCFS-OQ switch with the number of CMs of the central component (e.g., in each of the first set of CMs and the second set of CMs) being m≥2n−1 (e.g., a strictly non-blocking multistage circuit-switching network, such as, for example, a strictly non-blocking Clos-network) using a speedup of 2−1/k.

The proof of the corollary is relatively straightforward and not described herein for reasons of brevity. However, certain aspects of this corollary are noteworthy with regard to the disclosed subject matter. If we look at a strictly non-blocking multistage circuit-switching network, such as, e.g., the strictly non-blocking Clos-network (m≥2n−1), as a switching black box and structure a combined-input-output-queued (CIOQ) switch out of it, then a known theorem states that the minimum speedup for this Clos-network to emulate an OQ switch is 2−1/N. However, for the switch component, the speedup can be 2−1/k. Using the common configuration for the Clos-network, set n=k, which can indicate k=√N. Then, the speedup for the switch component (e.g., MMS-SSB switch) can become 2−1/√N, which can be slightly smaller than 2−1/N. This smaller speedup can be achieved by using a multi-stage switch architecture and single-stage buffering strategy, which is rather different from the CIOQ's two stages buffering and one stage switching. In particular, the switch component (e.g., MMS-SSB) can decompose the switch size N to a smaller number √N by the k (=√N) layers of switches.

In accordance with various aspects and embodiments, the switch component 202 can utilize a defined scheduling algorithm, such as an RGRG scheduling algorithm, to facilitate scheduling packets for switching into the switch component 202. The RGRG scheduling algorithm primarily focuses on the first switching phase in the switch component 202, since there will be no contentions for the second switching phase if the switch component 202 (e.g., using the switch management component 212) schedules packets during the first switching phase according to the memory compatibility constraints, as disclosed herein.

Figure 3:
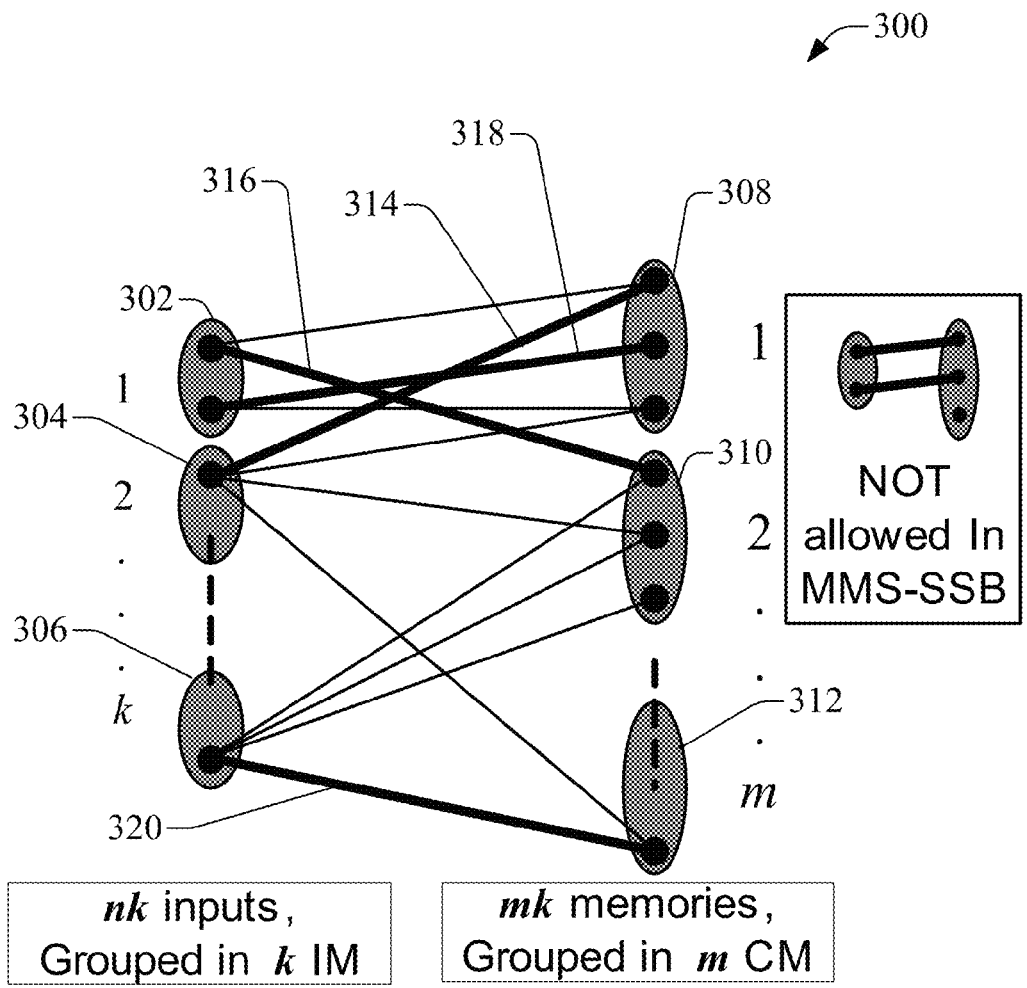
FIG. 3 depicts a bipartite matching graph that can facilitate modeling the scheduling of packets in a switch component during a first switching phase, in accordance with various aspects and embodiments.

Referring briefly to FIG. 3 (along with FIG. 2), depicted is a bipartite matching graph 300 that can facilitate modeling the scheduling of packets in the switch component 202 during the first switching phase, in accordance with various aspects and embodiments. As shown in the bipartite matching graph 300 in FIG. 3, an edge between an input (of the nk inputs) of an IM (e.g., $IM_1$ 302, $IM_2$ 304, or $IM_k$ 306) and a memory (of the mk memories (e.g., memory sub-components)) of a CM (e.g., $CM_1$ 308, $CM_2$ 310, or $CM_m$ 312) can indicate that the memory is compatible for that incoming packet. Shadowed circles can group inputs/memories according to the switch modules. A match in this graph 300 can correspond to an MSS-SSB switch configuration in one time slot. Conventional match definition dictates that one vertex be linked by at most one edge. However, the multistage circuit-switching network interconnection (e.g., Clos-interconnection) in the switch component (e.g., MSS-SSB switch) can impose yet another constraint to the final match since there is one and only one link (e.g., communication link or connection) between an IM (e.g., 214, 216, or 218 of FIG. 2) and a CM (e.g., 220, 222, 224, or 226 of FIG. 2). As shown in the bipartite matching graph 300 of FIG. 3, two edges linking the same pair of circles/groups are not allowed in the final match.

Therefore, a new match, called a dual match, can be defined for use in the bipartite matching graph 300 in FIG. 3. A dual match can be a set of edges that conform to the following two conditions:

1. No two edges in the set share a vertex; and
2. There is at most one edge linking a pair of inputs/memories groups.

For example, the set of thick edges, comprising edge 314, edge 316, edge 318, and edge 320, in the bipartite matching graph 300 of FIG. 3 can form a dual match.

To facilitate packet scheduling in the first switching phase of the switch component 202, the switch component 202 (e.g., via the switch management component 212) can determine or identify a dual match for all arriving packets in relation to every time slot. Initially it may appear difficult to find a maximum dual match since an additional constraint is imposed on the graph. However, the switch management component 212 can use a matching algorithm, the RGRG algorithm, which can be very efficient in determining or identifying the maximum dual match and the scheduling of packets by the switch component 202.

Figure 4:
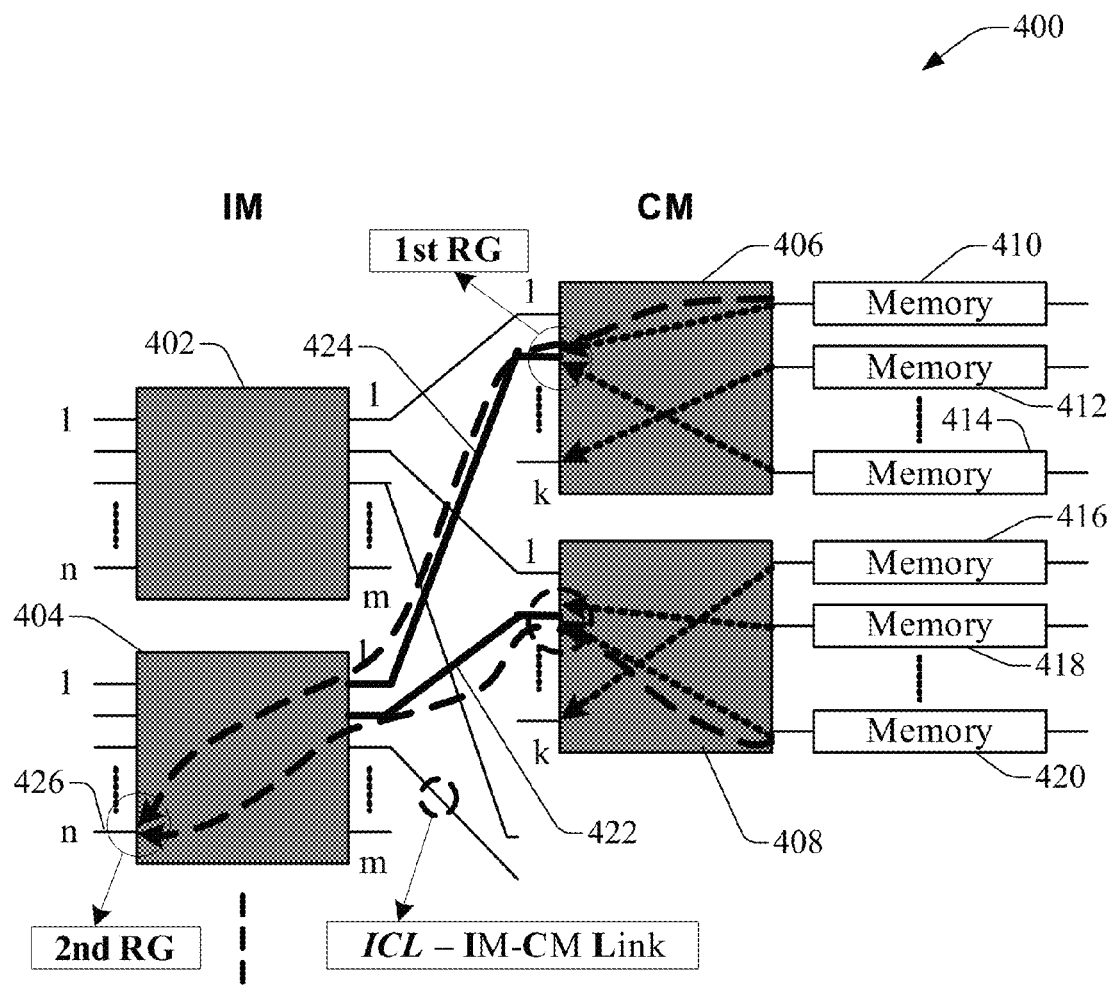
FIG. 4 illustrates a diagram of example request-grant, request-grant (RGRG) matching processes, in accordance with various aspects and embodiments of the disclosed subject matter.

The switch management component 212 can execute or run the matching algorithm in rounds. The matching algorithm can be referred to as the RGRG algorithm since every round involves two phases of "request-grant" (RG). Referring briefly to FIG. 4 (along with FIG. 2), FIG. 4 illustrates a diagram of example RGRG matching processes 400, in accordance with various aspects and embodiments of the disclosed subject matter. The RGRG matching processes 400 can involve a set of IMs, including $IM_1$ 402 and $IM_2$ 404, wherein each IM can be or can comprise an n×m switch, with n inputs (e.g., input ports) and m outputs; a set of CMs (e.g., a first set of CMs), including $CM_1$ 406 and $CM_2$ 408, wherein each CM can be or can comprise an k×k switch, with k inputs (e.g., input ports) and k outputs; and a set of memories (e.g., memory sub-components), including memory 410, memory 412, memory 414, memory 416, memory 418, and memory 420, wherein each memory can be used to store a packet during the first switch phase of the switch component (e.g., 202). As illustrated in example RGRG matching processes 400 of FIG. 4, the memories (e.g., 410 through 420) can be respectively controlled (e.g., via the respective memories and/or the switch management component 212) to match packets that are arriving to the switch component (e.g., 202). Links (e.g., communication links or connections, data paths, etc.), such as link 422, between an IM and a CM can be identified as an IM-CM link or an ICL.

The first RG operation associated with the RGRG algorithm can be to have the memories (e.g., 410 through 420) contend for the use of ICLs. The second RG operation of the RGRG algorithm can be to have the memories (e.g., 410 through 420) contend for compatible packets (e.g., compatible packets that are arriving at the inputs of the switch component 202) via an obtained ICL. The basic round operation of the RGRG algorithm can be defined as follows:

Request 1 (R1) operation: every unmatched memory (e.g., 410 through 420) can select (e.g., randomly select) one unmatched ICL (e.g., ICL 424) in its linked CM and can send a request to that unmatched ICL. The memory (e.g., memory 410) and/or the switch management component 212 can select an unmatched ICL (e.g., ICL 424) associated with the CM (e.g., $CM_1$ 406) that is linked to the memory, and can send a request to that unmatched ICL (or to the switch management component 212) to request the use of the ICL by the memory.

Grant 1 (G1) operation: after an ICL (or the switch management component 212) receives all requests from one or more memories, the ICL (or switch management component 212) can select (e.g., randomly select) one of the one or more memories and can grant that request to the selected memory.

Request 2 (R2) operation: after a memory (e.g., memory 410) receives a grant from the ICL (e.g., ICL 424) it requests (or from the switch management component 212), the memory (e.g., memory 410) can use that ICL (e.g., ICL 424) to send (e.g., randomly send) a request to a compatible packet in the IM (e.g., $IM_2$ 404) linking to that ICL (e.g., ICL 424). If there is no compatible packet in that IM at that time, the memory can do nothing.

Grant 2 (G2) operation: after a packet (or the switch sub-component of the IM that received the packet or its associated switch management component 212) receives requests from one or more of the memories (e.g., 410 through 420), the packet (or the switch sub-component of the IM or its associated switch management component 212) can select (e.g., randomly select) one of the one or more memories and can grant the request of that selected memory.

All of the memories (e.g., 410 through 420), ICLs (e.g., 422, 424), and packets can operate in parallel. After the respective memories receive respective grants from respective packets during the G2 operation, the switch component (e.g., 202) can thereby form a set of matches (e.g., matches between respective packets and respective memories), and can update the compatibility information. The switch component (e.g., 202) can determine or identify whether there are any packets associated with the switch component, and, if there are any packets that are left unmatched, the switch component (e.g., 202) can perform another round of the RGRG algorithm to facilitate matching any remaining unmatched packets with remaining memories available for receiving packets.

The switch component (e.g., 202) can communicate the respective packets (e.g., compatible packets) via the respective ICLs from the IMs (e.g., 402, 404) through the CMs (e.g., 406, 408) of the first set of CMs to the respective memories (e.g., 410 through 420), in accordance with the granted requests derived from execution of the RGRG algorithm, and the respective memories (e.g., 410 through 420) can store the respective packets until the respective packets are communicated out (e.g., switched out, read out, etc.) of the switch component (e.g., 202) at their respective departure times, wherein the respective packets can be assigned respective departure times (e.g., by the switch management component 212) at or near the time the respective packets arrive at the switch component 202 and/or based at least in part on the respective arrival times of the respective packets at the switch component 202.

As a specific example of the RGRG process, with regard to the R1 operation, each unmatched memory (e.g., memory sub-component of the memory component), including memory 410, memory 412, and memory 414 associated with (e.g., linked to) CM 406, and memory 416, memory 418, and memory 420 associated with (e.g., linked to) CM 408, can select (e.g., randomly select) an unmatched ICL in its linked CM and can send a request for use of the ICL to that unmatched ICL. As shown in the example RGRG matching processes 400 of FIG. 4, the memory 410 and memory 414 each select ICL 424 and each send a request for use of the ICL to the ICL 424; and the memory 412 selects the ICL (not shown) associated with switch k of the CM 406 and sends a request for use of the ICL to that ICL. As also shown in the example RGRG matching processes 400, the memory 418 and memory 420 each select ICL 422 and each send a request for use of the ICL to the ICL 422; and the memory 416 selects the ICL (not shown) associated with switch k of the CM 408 and sends a request for use of the ICL to that ICL.

With regard to the G1 operation, after an ICL (or the associated switch management component 212) receives all requests from one or more memories, the ICL (or its associated switch management component 212) can select (e.g., randomly select) one of the one or more memories and can grant that request to the selected memory. As shown in the example RGRG matching processes 400 of FIG. 4, the ICL 424 (or its associated switch management component 212)

selects (e.g., randomly selects) the memory 410 and can send a grant message to the memory 410 (or its associated switch management component 212) to notify the memory 410 that the request to use the ICL 424 has been granted (e.g., the memory 410 can be matched with the ICL 424, although the memory 410 is still unmatched with regard to a compatible packet); and the memory 412 and the memory 414, which was not selected by the ICL 424, can remain unmatched. As also shown in the example RGRG matching processes 400, the ICL 422 (or its associated switch management component 212) selects (e.g., randomly selects) the memory 420 and can send a grant message to the memory 420 (or its associated switch management component 212) to notify the memory 420 that the request to use the ICL 422 has been granted (e.g., the memory 420 can be matched with the ICL 422, although the memory 420 is still unmatched with regard to a compatible packet); and the memory 416 and the memory 418, which was not selected by the ICL 422, can remain unmatched.

With regard to the R2 operation, in response to receiving a grant from an ICL, the memory can use that ICL to send (e.g., randomly send) a request to a compatible packet in the IM linking to that ICL. If there is no compatible packet in that IM at that time, the memory can do nothing. As shown in the example RGRG matching processes 400 of FIG. 4, each unmatched memory with a grant to a communication link (e.g., ICL 422, ICL 424), including the memory 410 associated with the CM 406, and memory 420 associated with the CM 408, can select (e.g., randomly select) an unmatched compatible packet (e.g., the unmatched compatible packet associated with the switch sub-component n 426) in the IM (e.g., IM 404) associated with (e.g., communicatively connected to) the ICL (e.g., ICL 424 for memory 410, ICL 422 for memory 420) associated with the memory and can send a request to match with the packet (e.g., a match request) to that unmatched compatible packet (e.g., can send the request to the switch sub-component of the IM that contains or is associated with the unmatched compatible packet).

With regard to the G2 operation, after a compatible packet (or the switch sub-component of the IM that received the compatible packet or its associated switch management component 212) receives the requests from one or more of the memories (e.g., memory 410 and memory 420), the compatible packet (or the switch sub-component (e.g., 426) of the IM (e.g., 404) or its associated switch management component 212) can select (e.g., randomly select) one of the one or more memories and can grant the request of that selected memory. The compatible packet (or the switch sub-component n 426 of the IM 404 or its associated switch management component 212) can select (e.g., randomly select), for example, the memory 410 and can send a grant message to the memory 410 (or its associated switch management component 212) to notify the memory 410 that the request to match with the compatible packet has been granted (e.g., the memory 410 can be matched with the compatible packet); and the memory 420, which was not selected by the compatible packet (or the switch sub-component (e.g., 426) of the IM (e.g., 404) or its associated switch management component 212), can remain unmatched through this round of matching. Based on the grant, the compatible packet can be transmitted from the switch sub-component n 426 of the IM 404 to the CM 406 (e.g., to the switch sub-component of the CM 406) via the ICL 424, and the CM 406 can transmit the compatible packet to the memory 410 via the communication link between the CM 406 and the memory 410, where the compatible packet can be stored (e.g., temporarily) for a defined period of time that can be based at least in part on the departure time associated with the compatible packet. The first switching phase can be completed at least with regard to this packet. As part of the first switching phase, for any packets that remain unmatched with unmatched memories, the switch component (e.g., 200) can continue to perform the RGRG processes 400 for one or more additional rounds of matching to facilitate matching the unmatched packets with unmatched memories.

During the second switching phase, there will be no contentions for the second switching phase due in part to the switch component 202 (e.g., using the switch management component 212) scheduling packets during the first switching phase according to the memory compatibility constraints, based at least in part on the use of the RGRG algorithm during the first switching phase. The switch component 202 (e.g., via the switch management component, memories, and OM) can provide the respective packets as an output from the switch component 202 at the respective departure times of the respective packets.

A performance analysis of the use of the RGRG algorithm by the switch component 202 can be efficient in the scheduling of packets for the switch component 202. It can be seen that the memory requirement derived in Theorem 1 can guarantee that a maximum dual match of size N always can be achievable. The following analysis focuses on determining how many rounds actually may be used for the RGRG algorithm to achieve a maximum dual match. For simplicity of proof, the number of memories in the central can be $M=(2n-1)(2k-1) \approx 4nk=4N$.

Lemma 1: If there are r unmatched packets in an IM, there are at least $N+kr+n+1$ memories that are compatible with each of the r unmatched packets.

Proof: Consider one of the r unmatched input ports, naming it A. First, in the total 4N memories, at most $N-1$ memories (e.g., memory sub-components) contain packets which might have the same departure time as that arriving in A, which makes those $N-1$ memories incompatible with input port A. Secondly, for other $n-r$ input ports of the input component which reside in the same IM as A, they may occupy at most $(n-r)k$ memories since each one of them may use a CM which in turn blocks all k memories in that CM. Thirdly, for all other input ports of the input component that reside in other IMs than A, they may occupy at most $(k-1)n$ memories in total. Thus, the number of memories left compatible with input port A is at least:

$$4N - (N-1) - (n-r)k - n(k-1) = 3N + 1 - nk + kr - nk + n$$
$$= 3N + 1 - N + kr - N + n$$
$$= N + kr + n + 1$$

Lemma 2: In G1 operation of the RGRG algorithm, the probability for a memory B to be selected by the ICL it requests is $1-e^{-1}$. It is independent of the traffic patterns and size of the CM, k.

Proof: Focus on one CM in FIG. 4. Assume there are s memories unmatched, then no matter what the traffic pattern is, there are also s ICLs remaining unmatched. It is readily understood that when casting s balls into s boxes randomly, the probability for one ball to be chosen by a box is $1-e^{-1}$. This result can hold as long as the number of balls is equal to the number of boxes. In the RGRG matching process, the number of unmatched memories is equal to the unused ICLs linking that CM, and this fact is independent of the traffic pattern and the CM size k. Therefore, the probability of the memory B to be selected by or for the ICL it requests is always $1-e^{-1}$, regardless of the traffic patterns and size of the CM, k.

Lemma 3: If there are r unmatched packets in an IM, then the probability for a packet to remain unmatched after a RGRG basic round operation is less than $$e^{-(1-e^{-1})(1+\frac{n}{r}+\frac{n+1}{kr})}.$$

Proof: Consider a packet A and one of its compatible memories B (e.g., memory sub-components) of the memory component. A and B are linked by one and only one ICL which can be called C. The event that B will survive to send a request to A in the R2 operation only comes after these three sequential events:
 a) B has sent a request to the ICL C in the R1 operation.
 b) B has been selected by or for ICL C in the G1 operation.
 c) B has sent a request to A via ICL C in the R2 operation.

The probability for event a) is at least 1/k since there are at most k unmatched ICLs in one CM. The probability for event b) is $1-e^{-1}$, according to lemma 2. The probability for event c) is at least 1/r, since there are at most r compatible packets to B in the IM. Therefore, the probability for memory B to survive to send a request to packet A is at least $$(1/k)(1-e^{-1})(1/r) = (1-e^{-1})/kr.$$

As long as packet A receives at least one request from all of its compatible memories whose number is larger than N+kr+n+1 according to lemma 1, A can be matched for sure with a compatible memory of the memory component.

Packet A will remain unmatched only if none of its compatible memories survive to send it a request. The probability for this event is less than $$\left(1-\frac{1-e^{-1}}{kr}\right)^{N+kr+n+1} =$$

$$\left(1-\frac{1}{kr/(1-e^{-1})}\right)^{kr/(1-e^{-1})\times\frac{(1-e^{-1})(N+kr+n+1)}{kr}} \to e^{-(1-e^{-1})(1+\frac{n}{r}+\frac{n+1}{kr})}.$$

It can be seen that as r becomes smaller in the matching process, this number converges super exponentially to 0. It can provide a basic perception that the RGRG algorithm can converge extremely fast to a maximum MSSB match.

Theorem 2: The RGRG algorithm converges to the maximum dual match in O(log N) time in the worst case, and in O(log*N) time in average time. The convergence is independent of traffic patterns. With regard to O(log*N), $$\log * N \equiv \min\left\{k \left| \frac{\log\log \ldots \log N}{k} < 1\right.\right\},$$

which is typically less than 5 in real world, where N is normally less than $2^{65536}$.

Proof: According to lemma 3, it can be shown that the number of unmatched packets can decrease at least in a geometric ($e^{-(1-e^{-1})}$) speed, which can result in a O(log N) time to converge to 0. For the averaging O(log*N) time analysis, please refer to the appendix.

From Lemma 3, it is known that after one RGRG round, the number of unmatched packets $$r' = re^{-(1-e^{-1})(1+\frac{n}{r}+\frac{n+1}{kr})},$$

where r is the number of unmatched packets in the last round and r=N in the first round. It can be seen that the sequence of r is bounded by a geometric sequence whose convergence ratio is $e^{-(1-e^{-1})}$. It can be found that r will decrease to less than a fixed arbitrarily small number ϵ in O(log N) time.

However, the result in lemma 3 comes from the worst case that all the unmatched packets gather in a same IM. To calculate the average convergence time, it can be assumed that r packets are distributed in all k IMs uniformly. It is noted here that this uniformity is independent of the traffic patterns. It only relies on the RGRG matching process.

If all the r unmatched packets are distributed in k IM, the formula in lemma 3 will change to $$\left(1-\frac{1-e^{-1}}{k\times(r/k)}\right)^{N+kr+n+1} =$$

$$\left(1-\frac{1}{r/(1-e^{-1})}\right)^{r/(1-e^{-1})\times\frac{(1-e^{-1})(N+kr+n+1)}{r}} \to e^{-(1-e^{-1})(\frac{N}{r}+k+\frac{n+1}{r})}.$$

Therefore, the recursive formula for r becomes $$r' = re^{-(1-e^{-1})(\frac{N}{r}+k+\frac{n+1}{r})} < re^{-(1-e^{-1})\frac{N}{r}}.$$

Substituting r recursively and let $r_0=N$, and obtained is $$r_t < \frac{N}{\underbrace{e^{(1-e^{-1})}e^{(1-e^{-1})}\ldots e^{(1-e^{-1})}}_{t}}.$$

For any fixed arbitrary small ϵ, solve the function $$\frac{N}{\underbrace{e^{(1-e^{-1})}e^{(1-e^{-1})}\ldots e^{(1-e^{-1})}}_{t}} < \varepsilon \Rightarrow \frac{N}{\varepsilon} < \underbrace{e^{(1-e^{-1})}e^{(1-e^{-1})}\ldots e^{(1-e^{-1})}}_{t} \Rightarrow$$

$$\underbrace{\log_{e^{(1-e^{-1})}}\log_{e^{(1-e^{-1})}}\ldots \log_{e^{(1-e^{-1})}}\frac{N}{\varepsilon}}_{t} < 1.$$

The minimum of t is log*N, which is the time for r to converge to a fixed arbitrarily small number.

This theorem can thus illustrate that the converging speed using the RGRG algorithm can be significantly faster than that when using conventional packet scheduling techniques, such as the iSLIP and the DRRM, whose converging time is O(log N) in average and O(N) in the worst case. In addition, Lemma 2 can be very desirable (e.g., essential) to provide the traffic-independence property of the RGRG algorithm.

It is to be appreciated that, while the switch management component 116 as shown in FIG. 1 and described herein, the switch management component 212 as shown in FIG. 2 and described herein, and switch management components as illustrated in the other drawings and described herein have been presented as being a separate (e.g., unitary) and/or a centralized component, the disclosed subject matter is not so limited. In accordance with various aspects and embodiments, a switch management component(s) (e.g., a plurality of switch components, sub-components of a switch management component) can be distributed among various components (e.g., input component, IMs, central component, CMs, memory component, memory sub-components, output component, OMs, communication links (e.g., ICLs), packets, etc.) associated with a switch component (e.g., switch component 102, switch component 202, etc.), and/or can otherwise be decentralized, to facilitate the processing of packets associated with the switch component and/or controlling operations of the various components of the switch component. For example, a switch management component or sub-component can be part of or associated with a memory sub-component (e.g., an unmatched memory sub-component) and another switch management component or sub-component can be part of or associated with a communication link (e.g., an unmatched communication link, such as an unmatched ICL). The switch management component or sub-component that is part of or associated with the memory sub-component and the other switch management component or sub-component that is part of or associated with the communication link can be employed to facilitate matching the memory sub-component with the communication link based at least in part on a request-grant process, in accordance with a defined scheduling algorithm (e.g., the RGRG algorithm).

In accordance with various implementations and embodiments, a switch component (e.g., an MMS-SSB switch) also can emulate a general OQ switch supporting QoS, a PIFO queue model, such as more fully defined or described herein. Such a switch component can process packets using first and second switching phases based at least in part on another defined packet scheduling or matching algorithm (e.g., a defined modified scheduling algorithm).

It is noted that the switch component (e.g., the MMS-SSB switch) generally may not emulate a precise PIFO-OQ switch without internal memory speedup. It also is noted that, when a packet comes at a PIFO queue, the packet is not able to figure out which memories of the PIFO queue are compatible with the packet since the departure time of the packet may change afterwards due to the PIFO discipline. For example, a packet C arrives at the PIFO queue with a departure time t initially; so, it will conflict with all other packets bearing the departure time t since the memory of the PIFO queue cannot support two reads in time t. Because packet C's departure time may become t+1, t+2, etc., in the future, packet C may also conflict with all other packets bearing the departure time t+1, t+2, and so on. The departure conflicts can be virtually infinite. That is to say, there is no deterministic scheme for the MMS-SSB switch to emulate a strict PIFO-OQ switch.

Using an acceptable compromise, the QoS requirements of the switch component can be relaxed somewhat. The switch component (e.g., when emulating a PIFO queue) can be structured to operate to just guarantee to switch out packets within no more than a constant delay according to their departure times in the PIFO queue. That is to say, if a packet C should depart from the shadow strict PIFO-OQ switch at time t, C can be guaranteed to depart from the switch component (e.g., the MMS-SSB switch) in no later than time t+T, where T is a constant determined by the configuration.

With this compromise, the switch component can employ the disparate defined scheduling algorithm, which can be designed based at least in part on a desired matrix decomposition method. In general, as part of the disparate defined scheduling algorithm, the switch component can operate during the first switching phase to facilitate dispatching packets arriving at the switch component into the central memories (e.g., of the memory component) of the switch component. As further part of the disparate defined scheduling algorithm, during the second switching phase, the switch component can wait every N time slots and can lock all the packets required to be out within the N time slots in the PIFO queue (e.g., the emulated PIFO queue of the switch component). With the dispatching scheme of the first switching phase, the packets are guaranteed to be switched out in the next N time slots. In the meanwhile, another batch of packets have been locked for the next N time slots to switch. The processing of packets by the switch component can work in a pipeline manner. In such an architecture for the switch component and by the using the disparate defined scheduling algorithm, it can be shown that the maximum delay of each packet can be bounded within a constant delay time.

Figure 5:
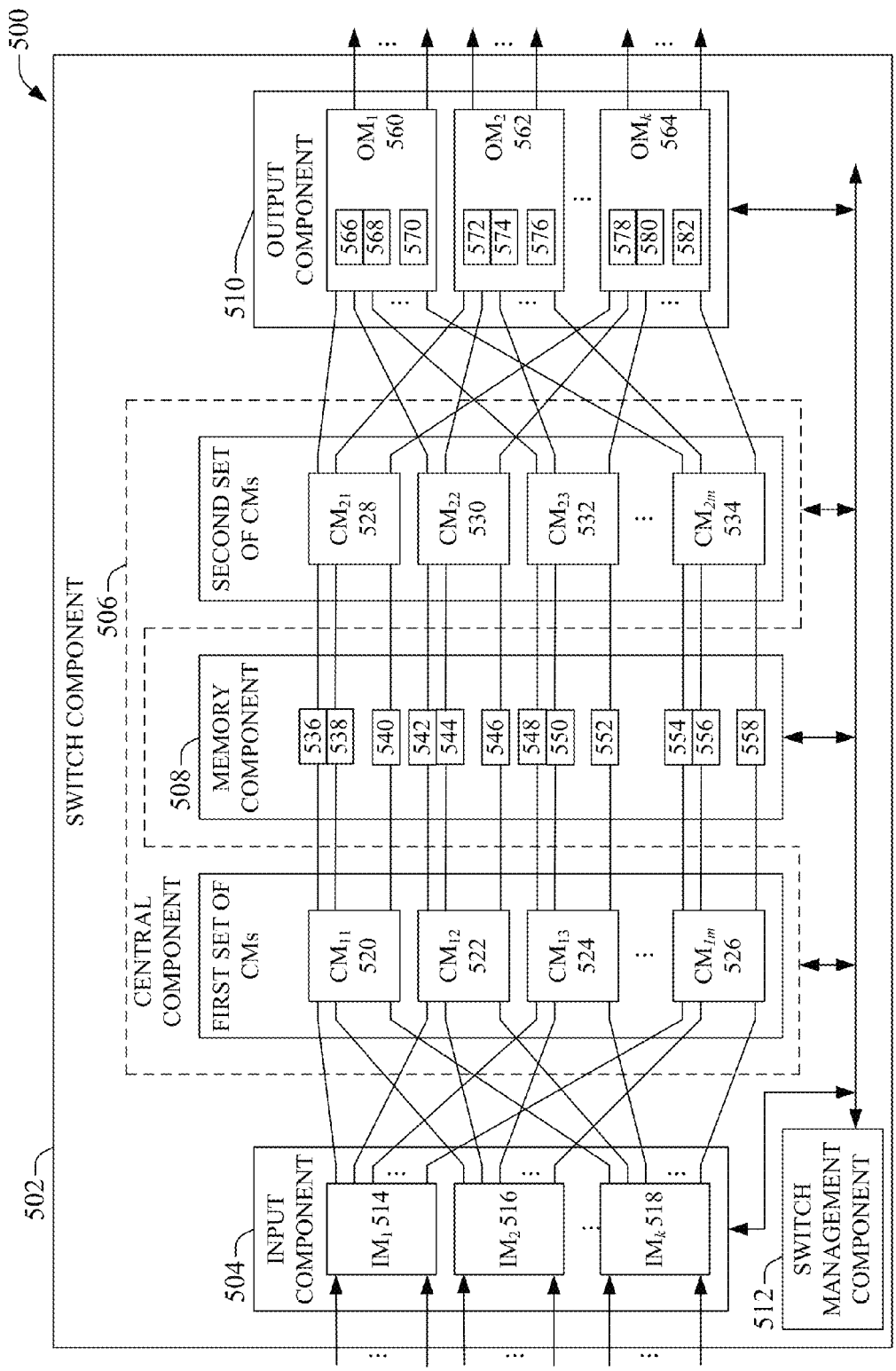
FIG. 5 depicts a block diagram of an example system that can facilitate processing packets of information, in accordance with various aspects and embodiments of the disclosed subject matter.

To facilitate scheduling and switching of packets by the switch component, when emulating a PIFO queue), the MMS-SSB architecture of the switch component can be modified. Referring to FIG. 5, depicted is a block diagram of an example system 500 that can facilitate processing (e.g., scheduling, switching, communicating, routing, etc.) packets of information, in accordance with various aspects and embodiments of the disclosed subject matter. The system 500 can comprise a switch component 502 that can receive packets of information and can control the scheduling, switching, communication, dispatching, routing, or other processing of the packets of information, in accordance with the disparate defined scheduling algorithm(s). In some implementations, the switch component 502 can be or can comprise an MMS-SSB switch, which can emulate, for example, a PIFO queue.

The switch component 502 can provide the packets as an output for communication (e.g., transmission to another component or device (e.g., a network device or component in a communication network, a communication device, etc.)). The switch component 502 can be, for example, part of one or more routers (e.g., scalable routers) associated with a communication network (e.g., an NGN-type communication network). The switch component 502 can include an input component 504, a central component 506, a memory component 508, an output component 510, and a switch management component 512, each of which respectively can be the same as or similar to, and/or can comprise the same or similar functionality as, respective components (e.g., respectively named components), as disclosed herein.

The input component 504 can comprise a set of IMs, including $IM_1$ 514, $IM_2$ 516, up through $IM_k$ 518, that can receive packets from a device or component (e.g., a network device or component, a communication device, etc.) associated with the communication network, wherein the set of IMs can include k IMs that each can be or can include a switch, such as an n×m switch, and wherein k, n, and m, can be respective integer numbers having respectively desired values. Each IM (e.g., 514, 516, 518) of the set of IMs can include n input ports that each can receive packets via a communication connection (e.g., link), and m output ports that can provide or output packets to a next destination via a communication connection.

The input component 504 can be associated with (e.g., communicatively connected to) the central component 506 that can include a first set of CMs and a second set of CMs. The first set of CMs can include m CMs, including $CM_{11}$ 520, $CM_{12}$ 522, $CM_{13}$ 524, up through $CM_{1m}$ 526, and the second set of CMs can include m CMs, including $CM_{21}$ 528, $CM_{22}$ 530, $CM_{23}$ 532, up through $CM_{2m}$ 534, and respective CMs (e.g., 520 through 534) of the central component 506 can be or can include, for example, k×k switches. Each CM (e.g., 520 through 534) of the central component 506 can include k input ports that each can be capable of receiving packets via a communication connection (e.g., link) from an output port of an IM of the input component 504, and k output ports that can provide or output packets to memory sub-components of the memory component 506 via a desired communication connection (e.g., ICL).

The memory component 508 can be interposed (e.g., in relation to communication of packets) between the first set of CMs (e.g., 520 through 526) of the central component 506 and the second set of CMs (e.g., 528 through 534) of the central component 506, wherein the respective outputs (e.g., output ports) of the first set of CMs can be associated with (e.g., communicatively connected to) respective inputs (e.g., input ports) of respective memory sub-components (e.g., 536, 538, 540, 542, 544, 546, 548, 550, 552, 554, 556, 558) of the memory component 508 (e.g., central memory), and the respective outputs (e.g., output ports) of the respective memory sub-components can be associated with (e.g., communicatively connected to) respective inputs (e.g., input ports) of the second set of CMs of the central component 506. The memory sub-components (e.g., memory sub-components 536, 538, 540, 542, 544, 546, 548, 550, 552, 554, 556, and 558) can be memory buffers that can be shared (e.g., fully shared) by the respective switches (e.g., switch sub-components) of the IMs (e.g., 514, 516, 518) and the OMs (e.g., 560, 562, 564).

The output component 510 can be associated with (e.g., communicatively connected to) the central component 506 (e.g., the outputs of the respective CMs of the second set of CMs of the central component 506). The output component 510 can include a set of OMs, including $OM_1$ 560, $OM_2$ 562, up through $OM_k$ 564, that each can include a defined number of switches, such as m×n switches, which can facilitate switching out, communicating, routing, and/or otherwise processing packets associated with the switch component 502. Each OM (e.g., 560, 562, 564) of the set of OMs can include m input ports that each can receive packets via a communication connection (e.g., link) with respective memory sub-components (e.g., 536, 538, 540, 542, 544, 546, 548, 550, 552, 554, 556, 558) of the memory component 508, and n output ports that can provide or output packets to a next or final destination via a communication connection with the next or final destination.

The switch management component 512 can control operations associated with the switch component 502. The switch management component 512 can be associated with (e.g., communicatively connected to) the input component 504, the central component 506, the memory component 508, and/or the output component 510 to facilitate controlling operations (e.g., controlling the switching or processing of packets) associated with the switch component 502. The switch management component 512 can employ the disparate defined scheduling algorithm(s) (e.g., modified scheduling algorithm, etc.) to facilitate processing packets, scheduling packets, switching packets, communicating packets, etc., to facilitate receiving packets at the input component 504 and providing the packets as an output from the output component 510 for further processing (e.g., distribution or transmission to a next destination or final destination).

The switch component 502 can be configured in a number of different ways. In some implementations, the switch component 502 can be configured to have a multi-stage (e.g., 3 stage) network that can be employed to facilitate constructing the scalable packet switches. Such configuration of the switch component 502 can be useful because the multi-stage network has relatively few stages such that buffers can be clearly integrated into it, and the multi-stage network can be modular based, which can be more practical for operators to scale their routers gradually, as desired. One property that the multi-stage network (e.g., symmetrical multi-stage network) can have is that there is one and only one link connecting modules in adjacent stages.

In contrast to some conventional switches, which employ input-side buffering, the switch component 502 does not use input-side buffering. Instead, the switch component 502 can be or can comprise an MMS-SSB switch that can use central buffering. In the architecture of the switch component 502, the central-stage buffers (e.g., the first and second sets of CMs) of the central component 506 can be fully shared. That is, all inputs of the input component 504 and all outputs of the output component 510 can have access to each buffer (e.g., each CM) in the central component 506. This can be achieved by splitting the central stage modules into two copies, comprising the first set of CMs and the second set of CMs, respectively.

One difference between the structure of the switch component 502 and, for example, the switch component 202 of FIG. 2, can be the addition of buffers (e.g., buffer components) at the inputs (e.g., input ports) of all of the OMs of the switch component 502, wherein this can allow the packets switched out of the CM of the switch component 502 to be buffered temporarily in the OMs before being switched out of the switch component 502. For instance, the OMs (e.g., 560, 562, 564) can include buffer components, including buffer components 566, 568, 570, 572, 574, 576, 578, 580, and 582, that can be respectively associated with the input ports of the OMs (e.g., 560, 562, 564) of the switch component 502. Each buffer component (e.g., buffer components 566 through 582) can operate at the line rate and can hold up to N packets.

A packet can traverse the switch component 502 as follows. First, the switch component 502 (e.g., via switch management component 512 or another component) can assign a departure time a packet according to the PIFO discipline and can write the packet into one of the central memories (e.g. memory sub-components) of the memory component 508 via the first switching phase, wherein, meanwhile, all of the packets already in the central memories of the memory component 508 can have their departure times changed (e.g., by the switch management component 512 or another component) if affected by the writing of the packet to one of the central memories. The switch component 502 (e.g., via switch management component 512 or another component) can switch the packet out of the right CM (e.g., a CM of the second set of CMs of the central component 506), and the packet can arrive at a buffer component of the OM of the output component 510. The switch component 502 can switch the packet out of the OM, and thus provide the packet as an output from the switch component 502.

In accordance with the disclosed subject matter, the switch component 502 can employ the disparate or modified defined switching algorithm. In structuring the disparate or modified defined switching algorithm, certain aspects of the first switching phase and the second switching phase can be defined or articulated.

With regard to packet scheduling during the first switching phase, a set of rules (e.g., three rules) for the first switching phase can be employed and observed (e.g., followed) when dispatching packets into the central memories (e.g., memory sub-components) of the memory component 508. When writing a packet C with a departure time t to a memory B (e.g., memory sub-component of the memory component 508), 1. the memory B is not about to be written by other arriving packets in the same time;

2. the ICL through which packet C is about to traverse or be communicated is not occupied by another arriving packet(s) in the same time; and 3. the memory B has no packet(s) destined for the OM for packet C bearing the departure time within the interval of (t−N,t) and (t,t+N).

The first two rules can be readily understood, since they represent the memory and link contentions and it can be assumed that there is no speedup in the OQ switch emulation. The third rule can be desirable (e.g., beneficial, essential, etc.) for the second switching phase of the switch component 502 to switch all the packets out in time.

The switch component 502 can employ an RGRG algorithm for the first switching phase that can be similar to the RGRG algorithm employed in the FCFS-OQ switch emulation with regard to the switch component 202 of FIG. 2. The RGRG process of the similar RGRG algorithm can resolve the memory and link contentions that are stated in the first two rules of the set of rules. The definition of packet-memory compatibility can be obtained from the third rule. The following can relate to the second switching phase scheduling in the PIFO-OQ switch emulation for the switch component 502.

It can be proven that, with the switch component 502 (e.g., modified MMS-SSB switch), the switch component 502 can switch out the locked batch of packets of the central component 506 (e.g., via the second set of CMs) in N time slots and every OM (e.g., 560, 562, 564) can switch out one batch of packets in N time slots as well. The disparate or modified defined scheduling algorithm can be designed for the second switching phase to schedule packets based at least in part on a desired matrix decomposition.

With regard to edge coloring, one property of the central memories is that one memory (e.g., memory sub-component of the memory component 508) can contain at most one packet that is destined for a specific output of the switch component 502 and can have a departure time within any arbitrary time slot interval of length N. To make it clear, the property can be formulated as follows:

for a given output port p and any time τ, in any memory sub-component of the memory component 508,
{packet: the packet is destined for p and bearing departure time t∈[τ, τ+N)}≤1.

This can be due in part to the third rule of the set of rules. Even if packets may change their departure times due to later arrivals, this property can hold.

Figure 6:
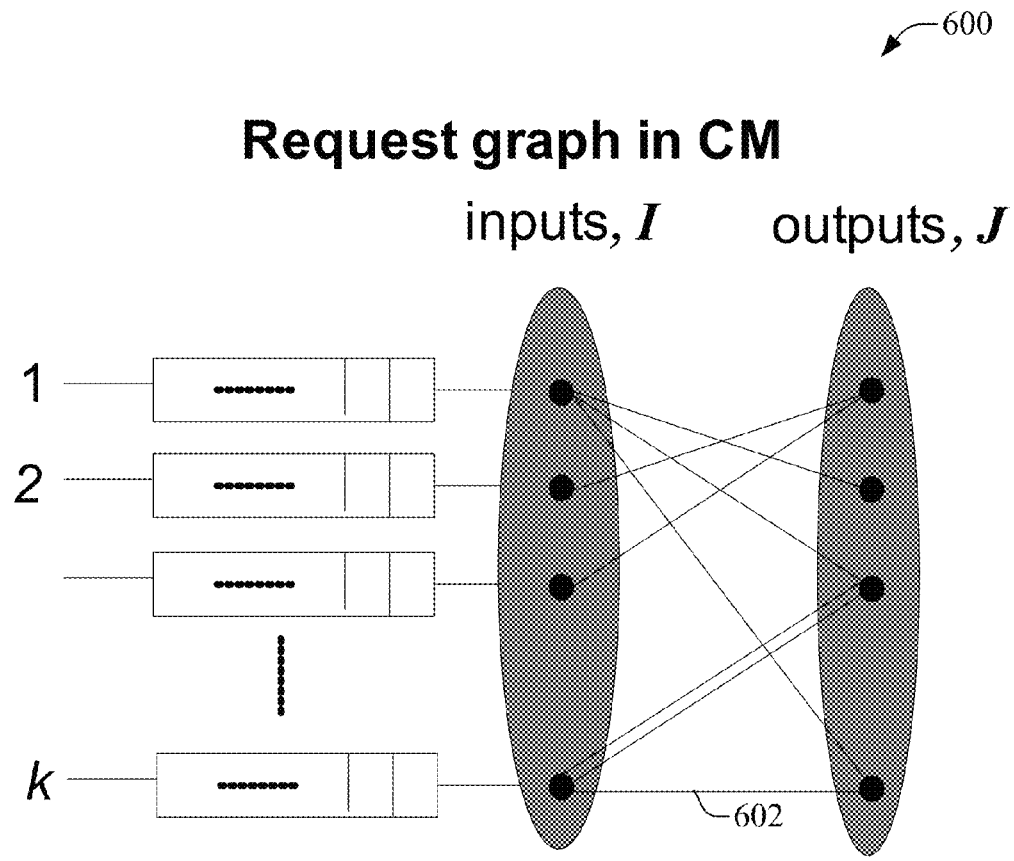
FIG. 6 illustrates a diagram of an example bipartite graph that can have 2k vertices and can be a request graph for a central module (CM) of a second set of CMs in N time slots, in accordance with various aspects and embodiments of the disclosed subject matter.

Focusing on one of the right CMs (e.g., one of the CMs in the second set of CMs) in the switch component 502. The inputs (e.g., input ports) of that CM can be linked with memories and its outputs (e.g., output ports) can be linked with an associated OM. This scheduling issue can be represented using a bipartite graph with 2 k vertices, as shown in FIG. 6. FIG. 6 illustrates a diagram of an example bipartite graph 600 that can have 2 k vertices and can be a request graph for a CM of the second set of CMs in N time slots, in accordance with various aspects and embodiments of the disclosed subject matter.

In every N time slots, there can be a request graph 600. An edge (e.g., edge 602) connecting vertex i to j can represent that a packet is to be transferred from memory i (e.g., memory sub-component i, such as memory sub-component 536) to output j (e.g., OM of the output component 510). From the memory property disclosed here, it can be seen that, in every consecutive N time slots, each memory (e.g., memory sub-component) can contain at most one packet destined for one output of the output component 510 of the switch component 502. Therefore, each memory (e.g., memory sub-component) can have at most N packets to send in this interval of N time slots. That is to say, the maximum degree of the input i is N. Consider the degree of the output j now. The output j links to an OM that has at most n outputs. Every memory (e.g., memory sub-component) can contain at most one packet for each of the n output ports. This indicates at most n edges between every pair (i,j). There can be k memories linking the CM. Therefore, the number of edges connecting the output j can be no more than nk, which is N.

From above analysis, it can be seen that scheduling in each CM can be transformed into an edge-coloring problem in the request graph 600, in which the maximum degree of vertices can be N. It can be proven that the request graph is N-colorable, which can be transformed into a series of switch configurations to schedule the batch of packets out of the CM in N time slots.

Similarly the scheduling in each OM can be analyzed. From the above analysis, it can be seen that in every N time slots there are at most N packets queued in an input (e.g., input port) of the OM. Therefore, the degree of the input i in the request graph for the OM can be no more than N. The degree of the output j also can be no more than N, since the output cannot have more than N packets to transfer in every N time slots. Similar to the CM, it can be seen that there can exist a series of switch configurations to schedule the batch of packets out of the OM in N time slots without contentions.

It has been shown that packets accumulated in the second switching phase in N time slots for the switch component 502 are able to be switched out of the switch component 502 in the next N time slot guaranteed by the edge coloring theorem. From this, the disparate or modified defined scheduling algorithm can be further described. The disparate or modified defined scheduling algorithm can be based at least in part on a desired matrix decomposition (e.g., a Birkhoff-von Neumann matrix decomposition). This matrix decomposition method can be employed in input queued crossbar switches. However, conventionally, this matrix decomposition method has only been used for a single-stage crossbar. The switch component 502 (e.g., MMS-SSB switch) can enable the desired matrix decomposition to scale in the multi-stage context in relation to the multi-stages (e.g., 3 stages) of the switch component 502. This is addressed in more detail herein.

To explain the idea, let the request graph 600 in FIG. 6 be represented by a traffic matrix $$R = \begin{pmatrix} r_{11} & \cdots & r_{1k} \\ \vdots & \ddots & \vdots \\ r_{k1} & \cdots & r_{kk} \end{pmatrix},$$

wherein $r_{ij}$ stands for $r_{ij}$ packets requested to be switched out from memory i to output j. According to the analysis above, it can be known that the following two conditions can hold:

$$\sum_{i=1}^{k} r_{ij} \leq N, \forall j$$

$$\sum_{j=1}^{k} r_{ij} \leq N, \forall i.$$

In accordance with the disclosed subject matter, a matrix $R=(r_{ij})$ that satisfies the above two conditions can be defined to be doubly substochastic. If both inequalities are equalities, the matrix R can be called doubly stochastic. It is noted that, in some definitions of doubly stochastic, matrix elements are decimals, which add up to less than 1, whereas, with regard to the disclosed subject matter, the matrix elements can be integers and they can add up to less than N. The matrix decomposition method that can be employed by the switch component 502 can comprise two operations: (i) it can first determine or identify a doubly stochastic matrix R' that majorizes the original request matrix R, and (ii) it can determine or identify a decomposition for the doubly stochastic matrix R'.

The first operation can be based at least in part on the following result.

Proposition 2: For a doubly stochastic matrix R', there exists a set of positive integers $\phi_i$ and permutation matrices $P_i$, i=1, 2, . . . , K for some K≤N such that $$R' = \sum_{i=1}^{K} \phi_i P_i, \text{ and } \sum_{i=1}^{K} \phi_i = N.$$

A permutation matrix can be a matrix whose columns and rows contain one and only one positive number which is '1', with the other elements being '0'. Once such a decomposition matrix is obtained by the switch component 502, the layer switch connections can be configured according to patterns p and can transfer packets proportionally to the patterns' weight $\phi_i$, i=1, 2, . . . , K.

The following can reiterate and/or summarize the disparate or modified defined scheduling algorithm that can be used by the switch component 502 (e.g., the MMS-SSB switch) to facilitate emulating a PIFO-OQ switch. For the first switching phase, the switch component 502 can dispatch packets that are arriving to the switch component 502 into the central memories (e.g., memory sub-components of the memory component 508) according to the set (e.g., three) of rules, wherein, as disclosed herein, the switch component 502 can employ an RGRG algorithm that can be similar to the RGRG algorithm used by the switch component 202 associated with FIG. 2.

For the second switching phase, each CM (e.g., 520 through 534) can configure its switching connections by patterns obtained from the desired matrix decomposition (e.g., the Birkhoff-von Neumann matrix decomposition) applied to the request traffic matrix, which is a k×k doubly substochastic matrix. Since the request matrix for an OM is m×n (not square) dimensional, there can be modifications made. For instance, m−n (assuming m>n) column vectors with all elements being 0 can be added to the request matrix, making it a square m×m doubly substochastic matrix. The desired matrix decomposition (e.g., a Birkhoff-von Neumann matrix decomposition) can be applied to that request matrix to obtain a series of connection patterns $P_i$.

The following theorem states the memory requirements and delay bounds for the switch component 502 (e.g., MMS-SSB switch) to facilitate emulating a PIFO-OQ switch.

Theorem 3: The MMS-SSB can emulate a PIFO-OQ switch within a relative delay of 3N−1 time slots with no internal speedup, if m≥4n−1.

Proof: First, it is proven that each packet will be switched out within a relative delay of 3N−1 time slots.

Consider an arriving packet C, its earliest possible departure time is just now, which can be denoted as time slot 1. The worst case is that the switch component 502 just starts switching a full batch of packets, which will cost at most N time slots, and then the packet C has to be lagged into the next batch of packets. The packet C will be switched out sometime in time slot interval [N+1, 2N]. Therefore, the relative maximum delay packet C may incur is 2N−1 time slots before arriving at the OM (e.g., 560, 562, or 564). In addition, the packet C can be stored in the buffer component (e.g., 566, 568, or 570, etc.) of the OM for at most another N time slots before the packet C is switched out of the switch component 502. Therefore, the total relative maximum delay the packet C may incur will add up to 3N−1 time slots, compared with that in the shadow PIFO-OQ switch.

Secondly, the number of central memories (e.g., memory sub-components of the memory component 508) to be used (e.g., necessary for use) by the switch component 502 can be calculated. Consider a packet C arriving at an IM of the switch component 502 and being about to be written into one of the central memories via the first switching phase. According to the first rule, there can be up to N−1 memories unavailable to the packet C, since there can be up to N−1 packets arriving from other input ports of the input component 504 of the switch component 502. The second rule can make up to (n−1)k memories unavailable to the packet C since there can be up to n−1 other packets arriving at the same IM (e.g., 514, 516, or 518) as the packet C and each of them can make a significant number of k memories (e.g., memory sub-components) of the memory component 508 unavailable by occupying the link between the IM and the CM of the first set of CMs (e.g., 220 through 226). The third rule can make up to 2(N−1) memories unavailable to the packet C.

By summing up and the above factors relating to the set of rules and using the pigeonhole principle, it can be shown that the switch component 502 can use (e.g., can use or need) at least $$(N-1) + (n-1)k + 2(N-1) + 1 = 4N - k - 2$$

memories (e.g., memory sub-components) to facilitate emulating a PIFO-OQ switch. (N=nk)

Summing up the above analysis, 4N−k memories (e.g., memory sub-components of the memory component 508) can be sufficient for the switch component 502 (e.g., MMS-SSB) to emulate a PIFO-OQ switch within a constant delay of 3N−1 time slots. In terms of the number of CMs that can be sufficient for the switch component 502 to emulate a PIFO-OQ switch, m (4N−k)/k=4n−1.

The disclosed subject matter illustrates the memory requirements for the disclosed switch components (e.g., switch component 102, switch component 202, switch component 502) to emulate both types of OQ switches, and designs and provides two scheduling algorithms (e.g., RGRG algorithm, disparate or modified scheduling algorithm) for the switch components as well. In particular, for both types of OQ switch emulation, the switch component can use the RGRG algorithm for the first switching phase to facilitate scheduling, switching, dispatching, or otherwise processing packets received by the switch component (e.g., 102, 202, 502). In the second switching phase of the switch component (e.g., 102, 202), when the switch component can be emulating the FCFS-OQ switch, the scheduling can be determined based at least in part on the respective departure times of the respective packets, wherein the respective departure times typically can be assigned to the respective packets when they are received by the switch component and can be based at least in part on the order the packets were received by the switch component. While in the PIFO-OQ switch emulation, during the second switch phase, the switch component (e.g., 502) can employs a defined matrix decomposition (e.g., the Birkhoff-von Neumann matrix decomposition) to facilitate determining or identifying a desired scheduling of packets being processed by the switch component.

The practical performance of the RGRG algorithm has been simulated. Table 1 and Table 2 illustrate the results from different simulations of the RGRG algorithm using various numbers of m (e.g., associated with the number of CMs for each set of CMs in the central component) and various switch component sizes. Table 1 depicts the frequency of rounds (5,000 time slots) for a switch component using the RGRG algorithm to find the maximum dual match with m=4n and the switch component size ranging from $2^6$ to $2^{10}$. Table 2 illustrates the frequency of rounds (5,000 time slots) for a switch component using the RGRG algorithm to find the maximum dual match with m=2n-1 and the switch component size ranging from $2^6$ to $2^{10}$.

TABLE 1

Frequency of rounds (5,000 time slots) for the RGRG algorithm to find the maximum dual match with m = 4n and switch size ranging from $2^6$ to $2^{10}$

| # of rounds | Uniform | | | Unbalanced | | |
|---|---|---|---|---|---|---|
| | $2^6$ | $2^8$ | $2^{10}$ | $2^6$ | $2^8$ | $2^{10}$ |
| 1 | 34 | 0 | 0 | 39 | 0 | 0 |
| 2 | 4964 | 4998 | 5000 | 4960 | 4999 | 4998 |
| 3 | 2 | 2 | 0 | 1 | 1 | 2 |

TABLE 2

Frequency of rounds (5,000 time slots) for the RGRG algorithm to find the maximum dual match with m = 2n − 1 and switch size ranging from $2^6$ to $2^{10}$

| # of rounds | Uniform | | | Unbalanced | | |
|---|---|---|---|---|---|---|
| | $2^6$ | $2^8$ | $2^{10}$ | $2^6$ | $2^8$ | $2^{10}$ |
| 1 | 0 | 0 | 0 | 0 | 0 | 0 |
| 2 | 883 | 16 | 0 | 1119 | 21 | 0 |
| 3 | 3905 | 4870 | 4939 | 3801 | 4915 | 4959 |
| 4 | 209 | 114 | 51 | 79 | 64 | 41 |
| 5 | 3 | 0 | 0 | 1 | 0 | 0 |

The simulation can facilitate determining or identifying how many rounds in practice a switch component using the RGRG algorithm can use (e.g., use or need) to determine or identify the maximum dual match. The matching processes on the switch component (e.g., MMS-SSB switch) were simulated with the number of inputs ranging from 64 to 1024 (=$2^{10}$). The experiments were run for 5,000 time slots with 100% traffic loads. The frequencies of the different number of rounds for the RGRG algorithm were recorded to find the maximum dual match. As part of the simulation, both uniform and unbalanced traffic are treated. With the unbalanced traffic, 75% traffic was allowed to aggregate to the upper half outputs. As can be seen from Table 1, with the configuration of the switch component being m=4n, 3 rounds of matches can be sufficient for the switch component, using the RGRG algorithm, to determine or identify a maximum dual match. The memory requirements also can be released. The switch component configuration of m=4n is provided to facilitate emulating OQ switches with regard to the worst-case traffic. Under most traffic (even the unbalanced one), the switch component can still achieve relatively high performance while using fewer memories (e.g., memory sub-components). In another set of experiments, the Clos-network configuration of m=2n−1 was used. As can be seen from Table 2, when m=2n−1 was used, 5 rounds of matches can be sufficient for the switch component, using the RGRG algorithm, to determine or identify a maximum dual match.

It also can be seen from Table 1 and Table 2 that the number of rounds does not scale with the switch size. This provides relatively strong evidence that the RGRG algorithm has a time complexity of O(log*N), since O(log*N) can be regarded as nearly a constant for even a considerably large N. In addition, results from both tables indicate that converging of the RGRG algorithm can be independent of the traffic patterns.

With regard to switches using the Birkhoff-von Neumann matrix decomposition, the least time complexity for the Birkhoff-von Neumann matrix decomposition thus far has been $O(N^{4.5})$, where N is the number of the switch ports. Therefore, a conventional single crossbar based Birkhoff-von Neumann IQ switch can hardly scale. In the switch components (e.g., MMS-SSB switch) of the disclosed subject matter, the switch size N can be decomposed into smaller internal switch modules where the complexity is $O(k^{4.5})$ for a CM of a switch component and $O(m^{4.5})$ for an OM of a switch component. In some configurations, k=$\sqrt{N}$ and m=4n=O($\sqrt{N}$). Therefore, in terms of the whole switch size, the complexity can decrease to $O(N^{2.25})$. This can be a significant improvement to the single crossbar based Birkhoff-von Neumann IQ switch, although it can still have a fairly large complexity. However, it is noted that this Birkhoff-von Neumann decomposition is not required for every time slot. The Birkhoff-von Neumann decomposition can be performed only every N time slots, as desired. This can make the Birkhoff-von Neumann decomposition applicable. As the switch size N scales, the time allowed for the Birkhoff-von Neumann decomposition also can increase. However, it can cause larger buffers in the OM and a larger delay that every packet may experience.

It also is noted that not all multi-layer switches can distribute the matrix decomposition into smaller modules, since the decomposition relies on the doubly stochastic traffic conditions. The overall doubly stochastic traffic does not necessarily mean all the smaller modules inside will have doubly stochastic conditions as well if packets are not dispatched into the modules properly.

Another difference between the disclosed switch components (e.g., MMS-SSB switches) and the Birkhoff-von Neumann IQ switch is that the matrices associated with the disclosed switch components are real traffic matrices, while in the Birkhoff-von Neumann IQ switch the matrix is an estimated rate matrix that relies on some external estimation methods. The disclosed switch components can perform exact packet scheduling by using real traffic matrices that can be preprocessed by the disclosed switch components during the first switching phase.

With regard to load-balancing in a switch component (e.g., MMS-SSB switch), from the load-balancing point of view, the first switch phase can be regarded as doing a load-balancing function for the switch component. In particular, based at least in part on employing the RGRG algorithm, a switch component can operate such that packets can be guaranteed to switch out in time (e.g., at their respective departure times) when the switch component is emulating a FCFS-OQ switch and packets can be guaranteed to switch out within a bounded delay when the switch component is emulating a PIFO-OQ switch.

Figure 7:
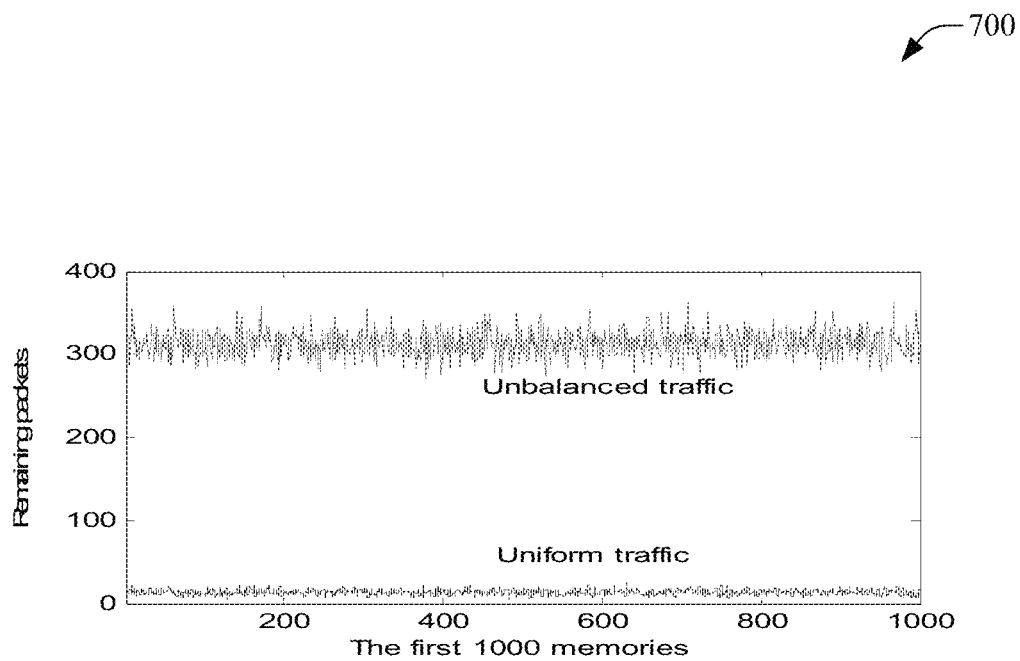
FIG. 7 depicts a graph illustrating the number of packets remaining in the first 1000 memories (e.g., memory sub-components of a memory component) of a switch component that is executing a request-grant, request-grant (RGRG) algorithm for both uniform and unbalanced traffic after 5,000 time slots, in accordance with aspects and embodiments of the disclosed subject matter.

To see the load-balancing effects associated with the RGRG algorithm, the distribution of packets remaining in a switch component (e.g., MMS-SSB switch) can be inspected. Simulations were performed using the same switch component configurations as disclosed herein. Referring briefly to FIG. 7, depicted is an example graph 700 illustrating a simulation of the number of packets remaining in the first 1000 memories (e.g., memory sub-components of a memory component) of a switch component that is executing the RGRG algorithm for both uniform and unbalanced traffic after 5,000 time slots, in accordance with aspects and embodiments of the disclosed subject matter. As can be seen in the graph 700, in either type of traffic pattern, the usages of different memories can be nearly the same. That is to say, packets can be distributed into the memories (e.g., memory sub-components) in a rather uniform way, regardless of whether the traffic pattern is uniform or unbalanced. This provides a good indication that the RGRG algorithm can play a good role in load balancing. Actually, the traffic-independence property previously proved in the disclosed subject matter indicates such load balancing as well.

The load balancing aspects of the disclosed switch component can be compared to that of a conventional load-balancing switch. With regard to one particular conventional load-balancing switch, a load-balanced Birkhoff-von Neumann switch, even though after load balancing in the first switching stage, the second stage will achieve 100% throughput with high probability under a wide range of traffic, this conventional load-balancing switch still only provides statistical performance guarantees. However, the disclosed switch components (e.g., MMS-SSB switches) can provide hard performance guarantees (e.g., by emulating OQ switches). It is at the cost of employing a defined scheduling algorithm in the first stage, and the disclosed subject matter has proven that the defined scheduling algorithm can work very efficiently.

In addition, the conventional load-balancing switch notoriously has an out-of-order problem. In contrast, with regard to the disclosed switch components (e.g., MMS-SSB switches), there is no out-of-order problem when a switch component emulates an FCFS-OQ switch. There can be an out-of-order problem for a switch component when emulating a PIFO-OQ switch, however, the disclosed subject matter can resolve this issue, as more fully disclosed herein.

The scalability of the disclosed switch components also can be compared with conventional single crossbar switches. For routers, hardware costs can include or be based on, for example, the number of crosspoints and the amount of memory. It can be determined that the crosspoints can be on the order of $O(N^{1.5})$ for the disclosed switch components (e.g., MMS-SSB switches), which can be the same as that in the conventional Clos-network. As can be seen, the disclosed switch components (e.g., MMS-SSB switches) can be more scalable than the single crossbar. For the memory requirements, a conventional CIOQ switch can require 2N memories (e.g., N memories in the input side and N memories in the output side), while the disclosed switch components (e.g., MMS-SSB switches) can use nearly 4N memories. However, in actual practice, the disclosed switch components (e.g., MMS-SSB switches) can employ a less amount of memory than that used in the conventional CIOQ switch. This can be derived from the following two observations. (i) From simulation, it can be shown that the disclosed switch components (e.g., MMS-SSB switches) can work well with memories less than 4N, for example, 2N. It actually is still an open issue whether 4N is a lower bound for the disclosed switch components (e.g., MMS-SSB switches) to emulate an OQ switch. (ii) Packets in the disclosed switch components (e.g., MMS-SSB switches) can be distributed relatively uniformly in all of the memories (e.g., memory sub-components of the memory component of a switch component). This can mean that in a switch component (e.g., MMS-SSB switch), each memory (e.g., memory sub-component) can be made smaller than that in the input side of the conventional CIOQ switch, which can have a large occupation variance.

With regard to a comparison of the respective scheduling algorithms, the RGRG algorithm that can be employed by a switch component (e.g., MMS-SSB switch) can have a complexity $O(\log^* N)$, while conventional heuristic algorithms, such as iSLIP, for conventional CIOQ switches can have a complexity of $O(\log N)$. $O(\log^* N)$ is more scalable than $O(\log N)$. It is noted that iSLIP does not have to achieve maximal matching every time if the traffic load is less than 100%. While in a switch component (e.g., MMS-SSB switch) using the RGRG algorithm, the switch component can determine or identify the maximum dual match every time. Otherwise, packets may be dropped since there are no buffers in the input side of the switch component.

One other distinguishing feature of the switch component (e.g., MMS-SSB switch) lies in that it can employ the disclosed scheduling algorithms, which can be independent of outside traffic. This also can be a major improvement over conventional switches by shifting buffering from the input side of the switch to the central portion of the switch, as with the disclosed switch component, and making the buffers (e.g., the CMs) fully shared.

Some comparisons relating to the switch component (e.g., MMS-SSB switch) are provided in Table 3. From Table 3, it can be seen that, when switching shifts from single-stage (e.g., the conventional CIOQ-VOQ) to multi-stage paradigms (e.g., the disclosed switch component), there can be performance gains in many aspects, as indicated by the results and features provided in Table 3.

TABLE 3

Comparison between a CIOQ switch and one embodiment of an MMS-SSB switch

|  | CIOQ-VOQ | MMS-SSB |
| --- | --- | --- |
| # of Crosspoint | $O(N^2)$ | $O(N^{1.5})$ |
| Scheduling complexity | $O(\log N)$ | $O(\log^* N)$ |
| # of memories | 2N | 4N |
| Load balancing | None | Yes |
| Traffic independent | No | Yes |
| Modular design | No | Yes |

It is noted that in real world implementation, the following practical issues may be encountered. For instance, in real world implementations, there can be practical issues relating to compatibility and/or randomness.

Compatibility—To facilitate implementing a switch component (e.g., MMS-SSB switch), it can be desirable to maintain the compatibility information. In some implementations, the switch component (e.g., using a switch management component) can employ a bit matrix to facilitate updating of the compatibility information. It is noted that there potentially can be an issue with the memory being able to identify the compatible set from all of the N input ports simultaneously. When employing the RGRG algorithm though, it can be seen that this issue can be resolved when the switch component has access to the compatibility information during the R2operation of the RGRG algorithm (e.g., the compatibility information is only needed in the R2 operation), wherein the memory randomly checks in the IM for a compatible packet. It can be desirable for the memory (e.g., the memory sub-component) (and/or the switch management component) to have whole compatibility information about all the inputs of the switch component. In some implementations, the RGRG algorithm can be modified or refined to a modified RGRG algorithm, wherein the memory (or the switch management component) does not maintain compatibility information any more, and during the R2 operation of the modified RGRG process, a memory (e.g., memory sub-component) (or the switch management component) can select (e.g., randomly select) one packet and if the packet is determined to be compatible with the memory, a dual match is found; and if the packet is determined to not be compatible with the memory, the memory (or the switch management component) can release the packet (e.g., for potential selection in relation to another memory sub-component). This modified RGRG algorithm can release the need for memories (e.g., memory sub-components) to update compatibility information. While this modification potentially may impact the matching efficiency since a memory might check several packets before finding a compatible packet, the modified RGRG algorithm still can provide faster performance than the conventional negotiation algorithms, such as that associated with iSLIP.

Randomness—The RGRG algorithm can be based at least in part on random selections (e.g., random selection of a memory sub-component, random selection of a compatible packet). In some implementations, a random number generator can be employed by a switch component to facilitate making such random selections. It is noted that there may be some implementation issues with regard to using a random number generator though. In certain other implementations, the switch component can employ a modified RGRG algorithm that can use other selection schemes, such as, for example, a round-robin selection scheme.

In accordance with an embodiment of the disclosed subject matter, one or more components (e.g., switch component, input component, central component, memory component, output component, switch management component, etc.) can utilize artificial intelligence (AI) techniques or methods to infer (e.g., reason and draw a conclusion based at least in part on a set of metrics, arguments, or known outcomes in controlled scenarios) an action to perform (e.g., automatically or dynamically) in response to the inference; scheduling packets for a switch component; selecting a memory sub-component for a grant of use of an ICL; selecting a memory sub-component to match with a packet; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) or method(s) disclosed herein) to facilitate rendering an inference(s) related to the system 100 (or another system(s) or method(s) disclosed herein).

In particular, the one or more components in the network can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methods, fuzzy logic methods can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

In accordance with various aspects and embodiments, the disclosed subject matter can be utilized in wireless and/or wired (e.g., wireline) communication networks. For example, the disclosed subject matter can be employed in IP-based networks that can communicate packets of information based at least in part on an IP-based or other network communication protocols and/or in wireless networks, such as for example, Third Generation (3G) type networks, Fourth Generation (4G) type networks, Universal Mobile Telecommunications Systems (UMTS), Code Division Multiple Access (CDMA) type systems, Wideband CDMA (WCDMA) type systems, etc.

Figure 8:
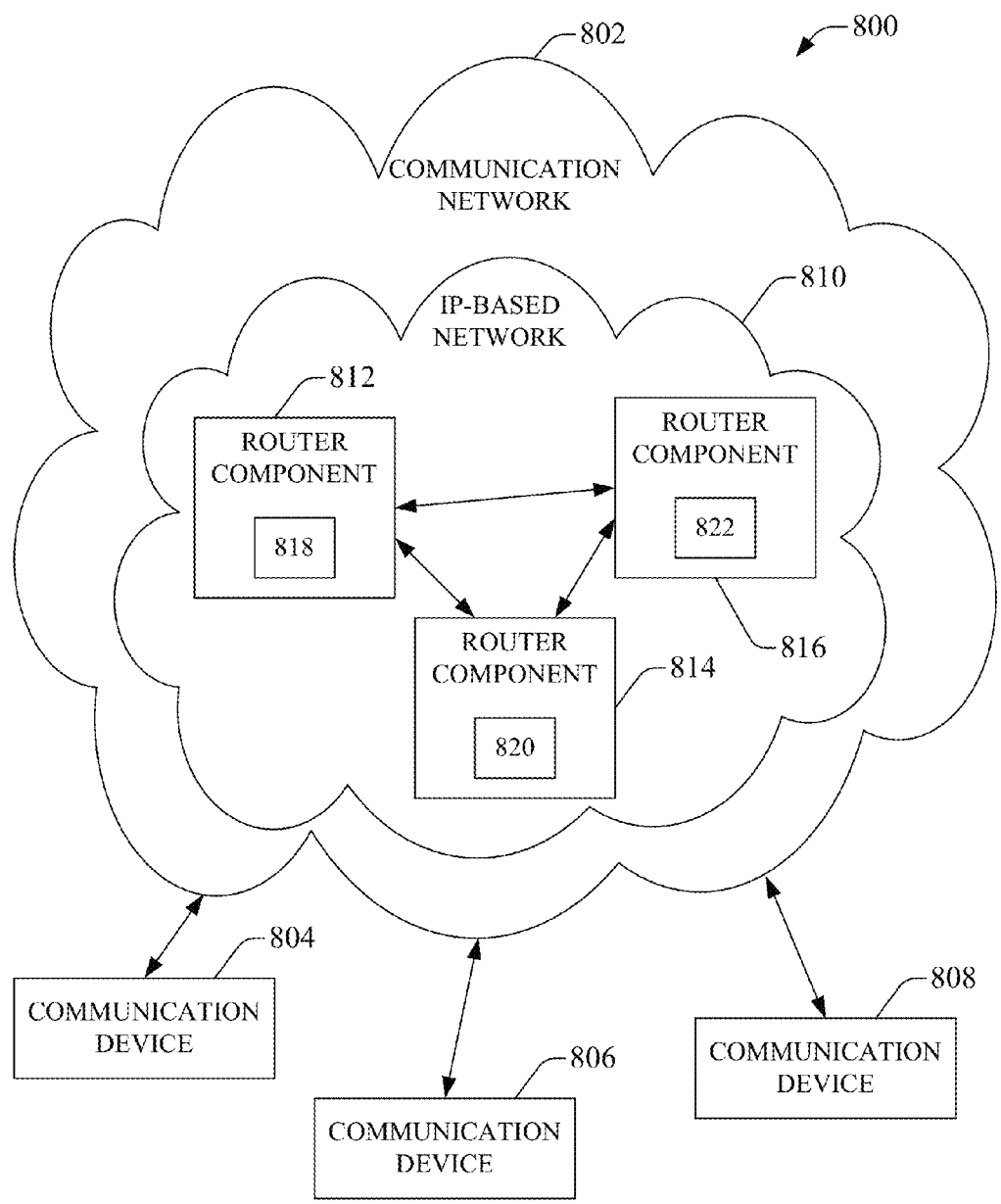
FIG. 8 presents a block diagram of an example system that can employ switch components to facilitate scheduling and other processing of packets of information and communication of the packets in a communication network environment, in accordance with various aspects and embodiments of the disclosed subject matter.

FIG. 8 illustrates a block diagram of an example system 800 that can employ switch components to facilitate scheduling and other processing of packets of information and communication of the packets in a communication network environment, in accordance with various aspects and embodiments of the disclosed subject matter. In accordance with various aspects, the system 800 can be utilized to facilitate communication of packets of information in a wireline and/or wireless communication environment.

The system 800 can comprise a communication network 802 that can be utilized to facilitate wireline or wireless communication of voice and data information between communication devices associated with (e.g., communicatively connected via a wireless or wireline communication connection or channel with) the communication network 802. The system 800 can include a plurality (e.g., virtually any desired number) of communication devices that can be associated with the communication network 802, wherein the plurality of communication devices can comprise, for example, communication device 804, communication device 806, and communication device 808. A communication device (e.g., 804, 806, or 808) can be or can comprise, for example, a computer, a phone (e.g., a mobile phone and/or smart phone), an electronic tablet or pad, a set-top box, an electronic gaming device, an application-specific computing device (e.g., communication device specifically for video conferencing), an Internet Protocol Television (IPTV), multi-media recorder/player, video recorder/player, audio recorder/player, printer, or a combination of communication devices and/or peripheral devices.

The communication network 802 can comprise an IP-based network 810 that can facilitate IP-based communications between communication devices (e.g., 804, 806, 808) associated with the communication network 802. The IP-based network 810 can facilitate communication of packets of information, scheduling of packets, routing of packets, and/or other processing of packets associated with the IP-based network 810. In some implementations, the communication network 802 can include a core network (e.g., a mobile core network) (not shown in FIG. 8) that can be associated with the IP-based network 810 to facilitate wireless communication of voice or data information by wireless communication devices associated with the communication network 802 with communication devices associated with the IP-based network 810. The core network can be, for example, a Second Generation (2G), Third Generation (3G), Fourth Generation (4G), or x-Generation (xG) network, where x can be virtually any desired integer or real value, that can be used to facilitate wireless communication of information between communication devices (e.g., wireless communication devices), associated with the communication network 802.

The IP-based network 810 and/or the core network, respectively, can allocate resources to communication devices (e.g., 804, 806, or 808) in the respective networks, convert or enforce protocols, establish and enforce QoS for the communication devices respectively associated therewith, provide applications or services in the respective networks, translate signals, and/or perform other desired functions to facilitate system interoperability and communication in the respective wireless communication networks. The IP-based network 810 and/or the core network, respectively, can include or be associated with desired components, such as routers, nodes, switches, interfaces, controllers, gateways, base stations, etc., that can facilitate communication of voice or data information between communication devices (e.g., 804, 806, or 808) in the communication network 802.

In some implementations, the IP-based network 810 (or other parts of the communication network 802 beyond the IP-based network 810) can comprise a plurality (e.g., virtually any desired number) of router components (e.g., enhanced routers that can include switch components), including, for example, router component 812, router component 814, and router component 816, that can facilitate communicating and routing packets of information in and associated with the communication network 802. All or a desired portion of the router components can comprise switch components (e.g., MMS-SSB switches) that can facilitate processing (e.g., scheduling, switching, communicating, routing, etc.) packets of information, in accordance with various aspects and embodiments of the disclosed subject matter. For example, the router component 812 can comprise the switch component 818, the router component 814 can comprise the switch component 820, and the router component 816 can comprise the switch component 822. The router components (e.g., 812, 814, 816) can be associated with (e.g., communicatively connected to) each other to facilitate communication of packets of information between the communication devices (e.g., 804, 806, or 808) associated with the communication network 802.

Figure 9:
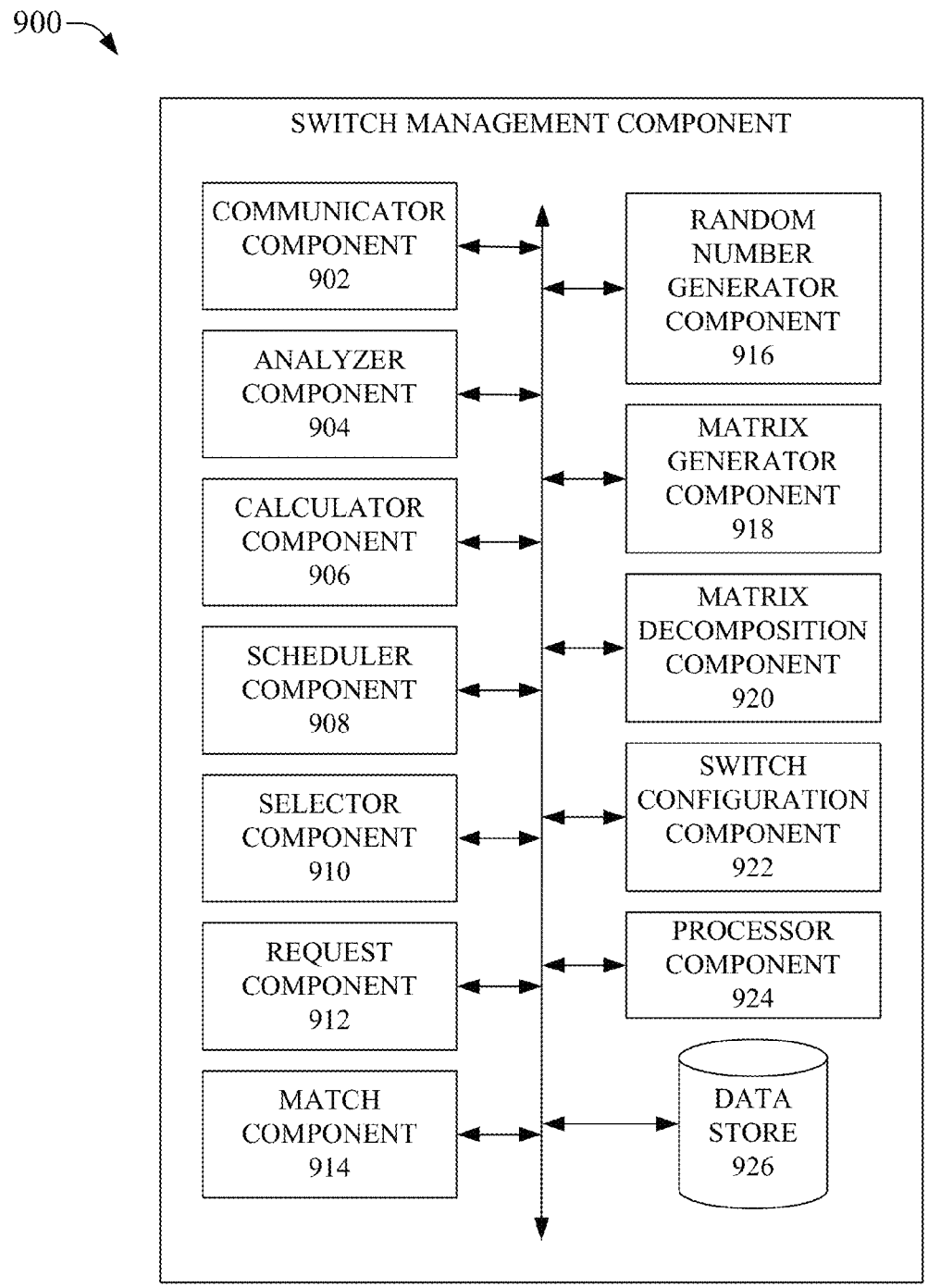
FIG. 9 illustrates a block diagram of an example switch management component in accordance with various aspects and embodiments of the disclosed subject matter.

FIG. 9 illustrates a block diagram of an example switch management component 900 in accordance with various aspects and embodiments of the disclosed subject matter. The switch management component 900 can be part of a switch component (e.g., an MMS-SSB switch), which can be part of a router component or other type of component in or associated with a communication network. While the switch management component 900 is shown in FIG. 9 (and elsewhere in the disclosed subject matter) as being a unitary component, as more fully disclosed herein, in some implementations, aspects or portions (e.g., components) the switch management component 900 can be distributed among various components (e.g., input component, central component, memory component, output component, etc.) of the switch component and/or can be decentralized in architecture.

The switch management component 900 can include a communicator component 902 that can be used to communicate (e.g., transmit, receive) information between the switch management component 900 and other components (e.g., an application management component, an application(s), etc.) of the switch component. The information can include or relate to, for example, signals and/or information relating to processing (e.g., scheduling, dispatching, switching out, departure, etc.) of packets associated with the switch component, control signals to facilitate controlling the processing of packets by the switch component, etc. The communicator component 902 can include one or more interfaces that can facilitate enabling the switch management component 900 to interface and/or connect to (e.g., communicatively connect, electrically connect, etc.) to other components or devices in or associated with the switch component.

The switch management component 900 also can comprise an analyzer component 904 that can analyze data to facilitate processing (e.g., scheduling, dispatching, switching out, departure, etc.) of packets associated with the switch component. For example, the analyzer component 904 can analyze information relating to a matrix decomposition associated with CMs (e.g., the second set of CMs) to generate analysis results that the switch management component 900 can use to facilitate determining a configuration for the switch connections of the CMs when the switch component is emulating a PIFO-OQ switch.

The switch management component 900 can contain a calculator component 906 that can perform calculations on data and/or make determinations relating to processing (e.g., scheduling, dispatching, switching out, departure, etc.) of packets associated with the switch component. For example, the calculator component 906 can perform calculations or make determinations relating to scheduling of packets, matching packets with memories (e.g., memory sub-components of the memory component), performing matrix decomposition, etc.

The switch management component 900 also can include a scheduler component 908 that can facilitate scheduling of packets for the switch component, including dispatching of packets from the IMs to the memory-subcomponents during the first switching phase of the switch component, and the switching out of packets from the memory sub-components during the second switching phase of the switch component. The scheduler component 908 can facilitate identifying or assigning departure times for packets and can facilitate modifying departure times of packets based at least in part on a desired factor(s) or criterion(s) (e.g., respective priority of packets).

The switch management component 900 also can include a selector component 910 that can select entities (e.g., communication link (e.g., ICL), packet, input or output ports of a component, etc.) to facilitate matching packets with respective memory-sub-components. For example, the selector component 910 can be used by or in connection with a memory sub-component of the memory component to facilitate selecting an unmatched communication link (e.g., ICL) in the CM linked to the memory sub-component to facilitate sending a request to use the communication link during a round of the RGRG process. Also, if and when the memory sub-component is granted the use of the communication link, the selector component 910 can be used by or in connection with the memory sub-component to facilitate selecting an unmatched compatible packet in the IM linking to the communication link to facilitate sending a request to match with the compatible packet during a round of the RGRG process. The selector component 910 also can select items of data (e.g., data relating to scheduling of packets, data relating to analysis results or calculations performed on data, etc.), an applicable algorithm (e.g., a scheduling algorithm, such as the RGRG algorithm or the modified scheduling algorithm associated with emulating a PIFO-OQ switch, etc.), switch-related parameter values, or other information, to facilitate performing one or more functions relating to controlling processing of packets associated with the switch component.

The switch management component 900 can comprise a request component 912 that can generate and send requests (e.g., a request to use a communication link, a request to match with a compatible packet, etc.) to desired components or entities associated with the switch component. For example, the request component 912 can be used by or in connection with a memory sub-component to facilitate generating a request to use an unmatched communication link in the CM linked to the memory sub-component link, and sending the request to the communication link or associated component (e.g., CM, component of a switch management component (e.g., 900) associated with the communication link or CM, etc.), during a round of the RGRG process.

The switch management component 900 also can include a match component 914 that can facilitate matching packets with memory sub-components in accordance with a defined scheduling algorithm. For instance, the match component 914 can facilitate the granting of requests (e.g., a request to use a communication link, a request to match with a compatible packet, etc.) to facilitate matching packets with memory sub-components. As one example, the match component 914 can be used by or in connection with an unmatched communication link (and/or a component (e.g., CM) associated with the communication link) to facilitate granting a request for use of the communication link received from, or in connection with, a memory sub-component, wherein the selector component 910 can facilitate selection (e.g., via random selection) of the request associated with the memory sub-component from one or more requests received from, or in connection with, one or more memory sub-components.

The switch management component 900 further can employ a random number generator component 916 that can generate random numbers (e.g., true or pseudo random numbers) that can be used to facilitate random selection of a request (e.g., a request to use a communication link, a request to match with a compatible packet, etc.) or an entity (e.g., a communication link, a memory sub-component, a packet, etc., or a component respectively associated therewith) associated with a request from a set of requests or a set of entities. For instance, the random number generator component 916 can provide random numbers to other components of the switch component to facilitate performing operations relating to the switch component that involve randomness (e.g., random selection of items (e.g., requests) or entities).

The switch management component 900 also can include a matrix generator component 918, matrix decomposition component 920, and switch configuration component 922. The matrix generator component 918 can generate a traffic matrix or other matrix relating to the CMs of the switch component in relation to the second switching phase of the switch component (e.g., when emulating a PIFO-OQ switch) to facilitate performing of a traffic decomposition of the traffic matrix or other matrix to facilitate determining a configuration of switch connections for the CMs (e.g., the second set of CMs) to use during the second switching phase. The matrix decomposition component 920 can utilize a decomposition method, technique, algorithm, etc., to perform a matrix decomposition to decompose the traffic matrix or other matrix to determine, generate, or identify a configuration for switch connections for the CMs for use during the second switching phase, in accordance with the defined modified scheduling algorithm. The switch configuration component 922 can configure CMs (e.g., the second set of CMs) based at least in part on the configuration for switch connections for the CMs that was determined, generated, or identified by the matrix decomposition component 920.

The switch management component 900 also can comprise a processor component 924 that can be configured to confer and/or facilitate providing functionality, at least partially, to substantially any electronic component in or associated with the switch management component 900 and the switch component associated therewith. For instance, the processor component 924 can facilitate performing operations on data (e.g., information, signals, symbols, bits, chips, etc.) to facilitate processing (e.g., scheduling, dispatching, switching out, departure, etc.) of packets associated with the switch component, determining or generating a configuration for switch connections for CMs, configuring switch connections for CMs, selecting a defined scheduling algorithm, executing a defined scheduling algorithm, etc.

In another aspect, the switch management component 900 can include a data store 926 that can store data structures; code instructions; system or device information like policies and specifications; information relating to processing (e.g., scheduling, dispatching, switching out, departure, etc.) of packets associated with the switch component, determining or generating a configuration for switch connections for CMs, configuring switch connections for CMs, selecting or executing a defined scheduling algorithm, etc.; scheduling policies; and so on. The processor component 924 can be coupled to the data store 926 in order to store and retrieve information (e.g., information relating to processing (e.g., scheduling, dispatching, switching out, departure, etc.) of packets associated with the switch component, determining or generating a configuration for switch connections for CMs, configuring switch connections for CMs, selecting or executing a defined scheduling algorithm, etc.) desired to operate and/or confer functionality to the communicator component 902, the analyzer component 904, the calculator component 906, the scheduler component 908, etc., of the switch management component 900 and/or other operational components of switch management component 900.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Certain connections (e.g., communication connections, links, or edges) depicted in the drawings are shown with arrowheads and, for clarity in the drawings, certain connections (e.g., communication connections or links) are depicted without arrowheads. It is to be appreciated and understood though that the connections depicted without arrowheads can be used to communicate data, signals, packets of information, etc., in either direction (e.g., can communicate data, signals, packets of information, etc., bi-directionally) from one component to another component (e.g., from the input component to the central component, and/or from the central component to the input component, etc.). It is to be further appreciated and understood that, while certain connections (e.g., communication connections, links, or edges) are depicted as overlapping or crossing over each other (e.g., between the IMs and the CMs of the first set of CMs; between the second set of CMs and the OMs; etc.) in some of the figures (e.g., FIGS. 1-6), the overlapping of two connections is not intended to indicate, and does not indicate, that those two overlapping connections are communicatively connected to each other, unless the disclosed subject matter clearly specifies otherwise. For example, in FIG. 2, the communication connection (e.g., ICL) between $IM_1$ 214 and $CM_{12}$ 222 overlaps or crosses over, but is not communicatively connected to, the communication connection between IM$_2$ 216 and CM$_{11}$ 220; and the communication connection between IM$_1$ 214 and CM$_{12}$ 222 also overlaps or crosses over, but is not communicatively connected to, the communication connection between IM$_k$ 218 and CM$_{11}$ 220.

Figure 10:
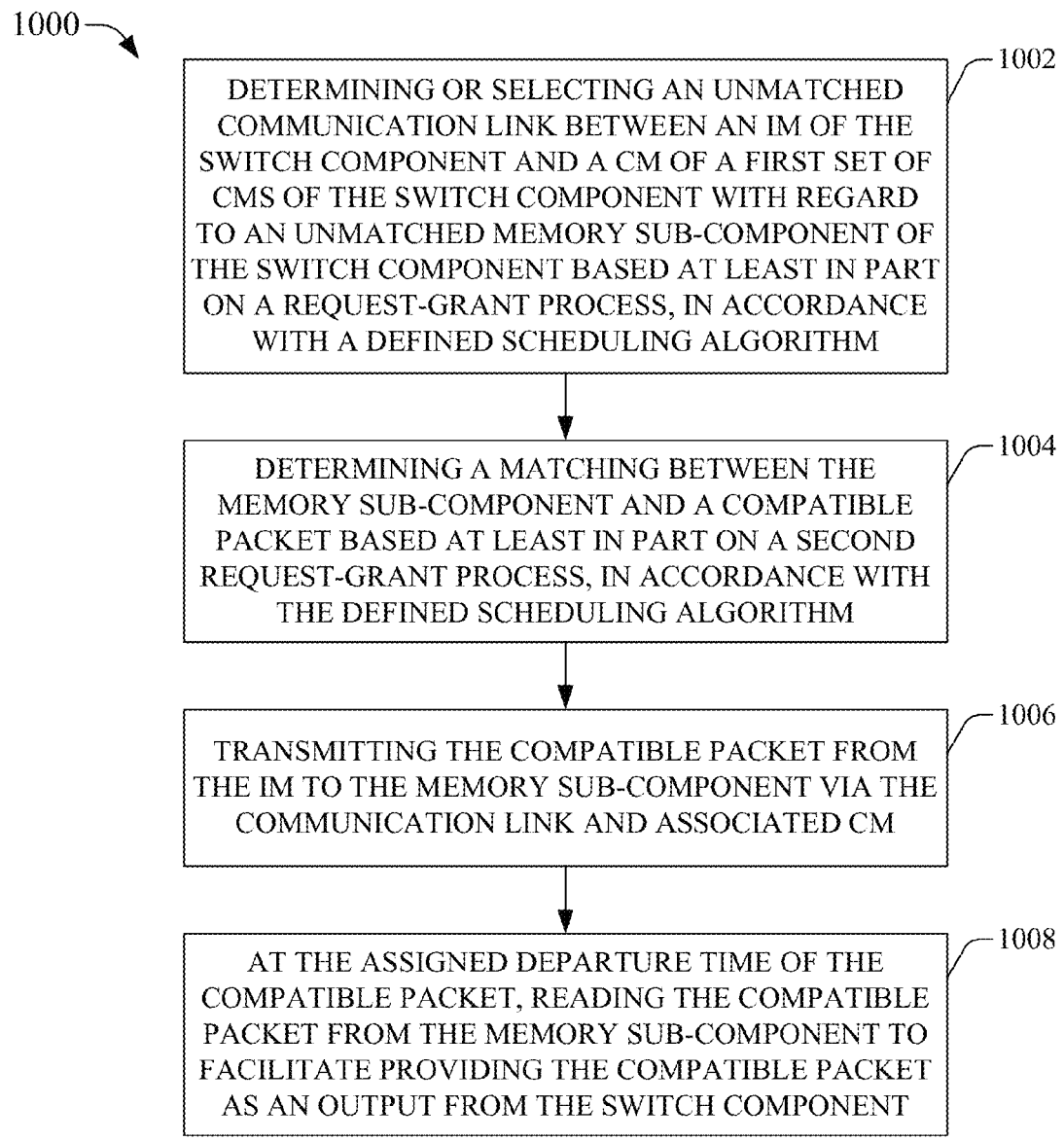
FIG. 10 presents a flowchart of an example method that can facilitate processing (e.g., scheduling, switching, communicating, routing, etc.) packets of information, in accordance with various aspects and embodiments of the disclosed subject matter.
Figure 11:
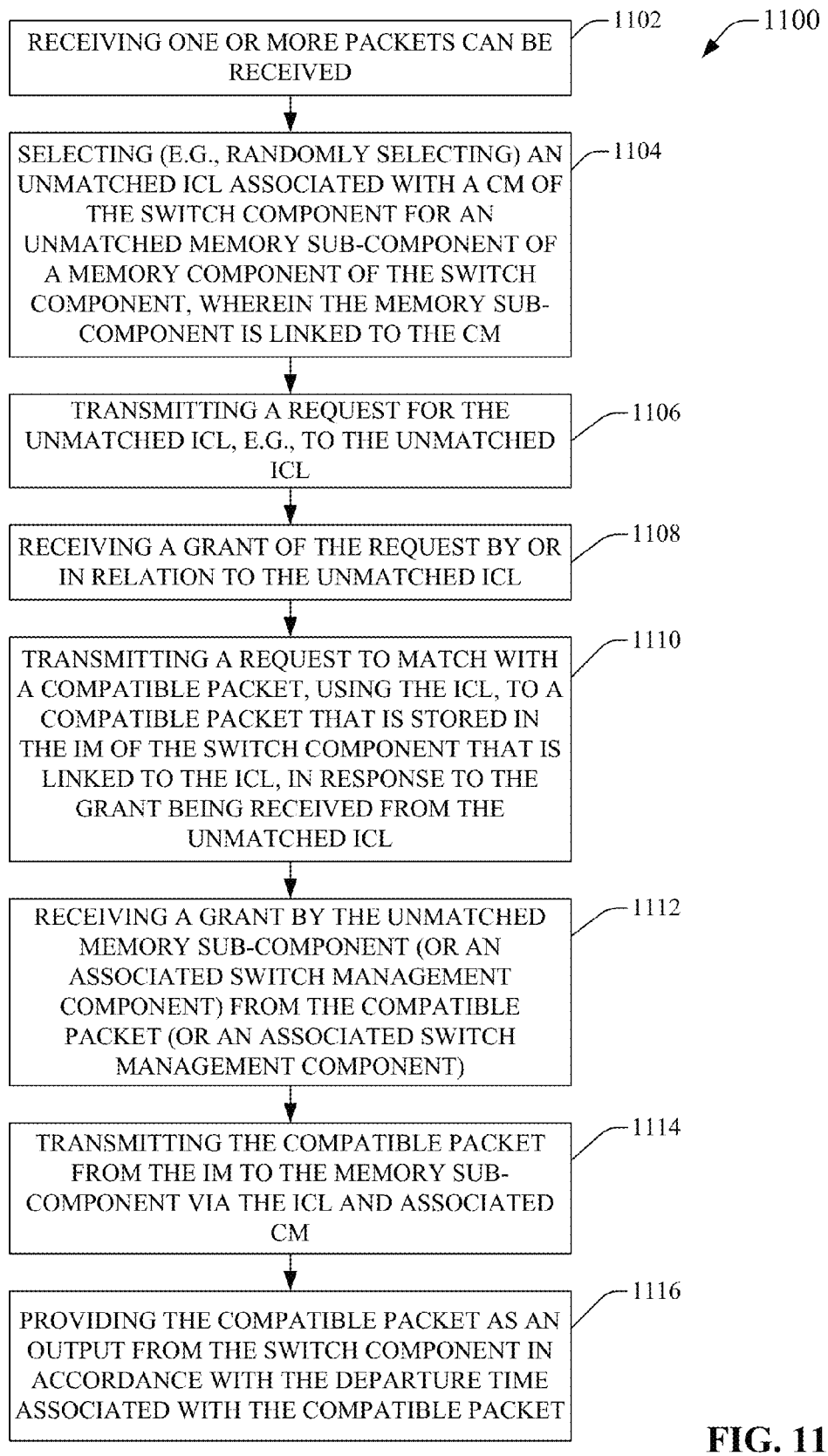
FIG. 11 depicts a flowchart of an example method that can facilitate processing (e.g., scheduling, switching, communicating, routing, etc.) packets of information based at least in part on a defined scheduling algorithm (e.g., an RGRG algorithm or modified RGRG algorithm), in accordance with various aspects and embodiments of the disclosed subject matter.
Figure 12:
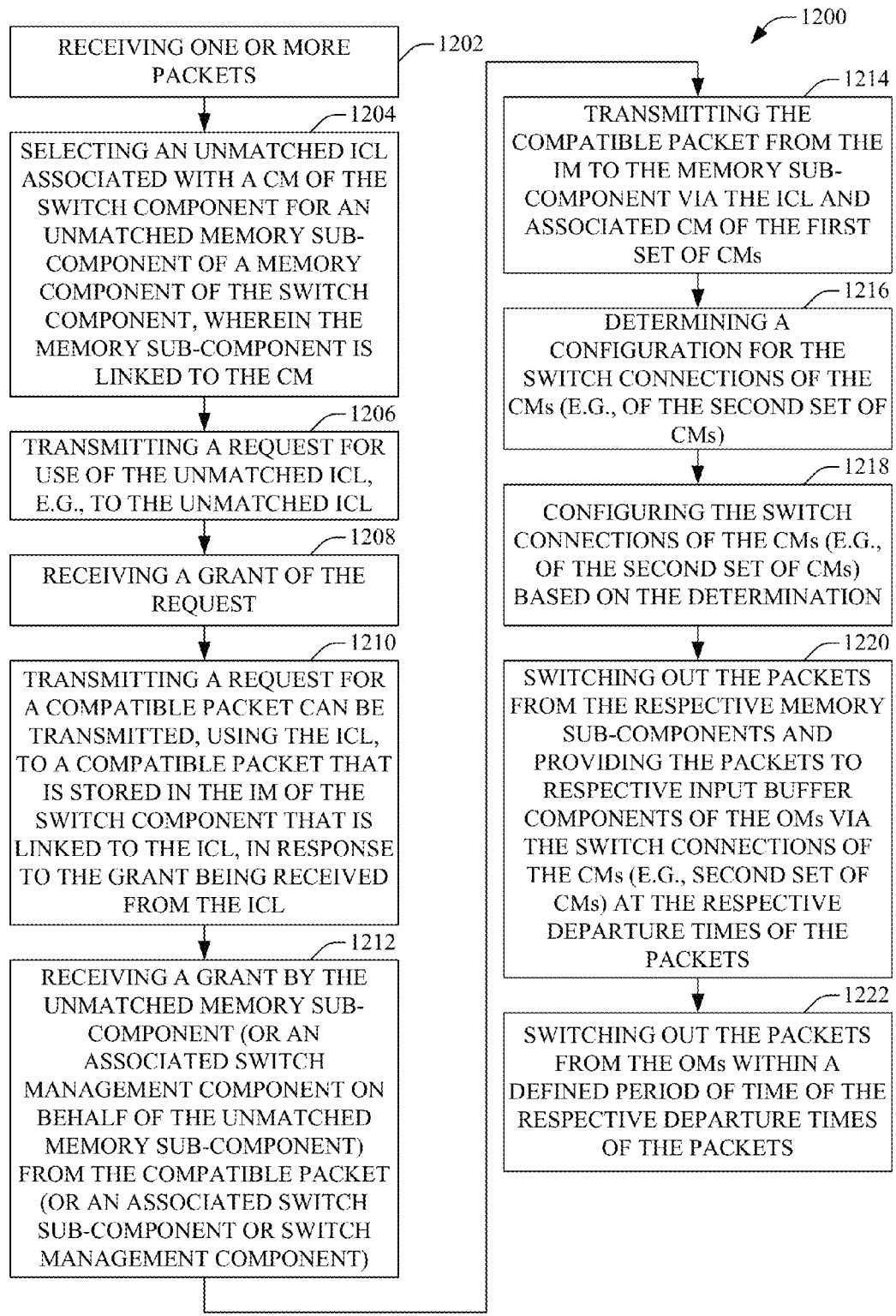
FIG. 12 illustrates a flowchart of an example method that can facilitate processing (e.g., scheduling, switching, communicating, routing, etc.) packets of information based at least in part on a defined scheduling algorithm (e.g., a modified scheduling algorithm that can be based in part on the RGRG algorithm), in accordance with various aspects and embodiments of the disclosed subject matter.

In view of the example systems described herein, example methods that can be implemented in accordance with the disclosed subject matter can be better appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 presents a flowchart of an example method 1000 that can facilitate processing (e.g., scheduling, switching, communicating, routing, etc.) packets of information, in accordance with various aspects and embodiments of the disclosed subject matter. The method 1000 can be employed, for example, by a switch component (e.g., MMS-SSB switch). The switch component can perform all or a desired portion of the operations of the method 1000 in accordance with a defined scheduling algorithm (e.g., RGRG algorithm). The method 1000 can employ the defined scheduling algorithm to facilitate scheduling and dispatching packets by the switch component to facilitate enabling the switch component to emulate an FCFS-OQ switch. The switch component can perform a first switching phase and a second switching phase to process packets received by the switch component and provide these packets as an output, wherein the first switching phase can involve receiving the packets by the switch component and dispatching these packets to respective memory sub-components, and the second switching phase can involve the reading or switching out of these packets from the respective memory sub-components to provide these packets as an output from the output ports of the OMs of the output component of the switch component.

At 1002, an unmatched communication link between an IM of the switch component and a CM of a first set of CMs of the switch component can be determined or selected with regard to an unmatched memory sub-component of the switch component based at least in part on a request-grant process, in accordance with a defined scheduling algorithm. The switch component can receive one or more packets of information for processing (e.g., dispatching, communicating, routing, etc.) in relation to communication of the packets in a communication network. The one or more packets can be received at respective input ports of the IMs of the input component of the switch component.

With regard to each packet, the switch component (e.g., the switch management component, the unmatched memory sub-component of the memory component, or another component(s) of the switch component associated with the memory sub-component) can determine or select (e.g., dynamically and/or randomly determine or select) an unmatched communication link (e.g., ICL) of a plurality of communication links between the IM and the CMs of the first set of CMs. By or on behalf of the unmatched memory sub-component, a request for use of the unmatched communication link can be communicated to the unmatched communication link or component (e.g., switch management component, CM, etc.) associated therewith. The unmatched communication link also can receive one or more other requests with regard to one or more other unmatched memory sub-components. The unmatched communication link or an associated component of the switch component can select (e.g., dynamically and/or randomly determine or select) one of the unmatched memory sub-components and can grant the request of that selected unmatched memory sub-component.

At 1004, a matching between the memory sub-component and a compatible packet can be determined based at least in part on a second request-grant process, in accordance with the defined scheduling algorithm. In response to receiving the grant, the memory sub-component or an associated component (e.g., switch management component) can transmit a request to match with a compatible packet. The memory sub-component or associated component can determine or select (e.g., dynamically and/or randomly determine or select) the unmatched compatible packet to which to send the request. The unmatched compatible packet also can receive such a request from one or more other memory sub-components of the memory component. The packet or a component (e.g., switch management component, IM, etc.) of the switch component that is associated with the packet can determine or select (e.g., dynamically and/or randomly determine or select) the memory sub-component from the one or more memory sub-components that sent requests to match with the compatible packet to facilitate creating or determining the matching between the memory sub-component and a compatible packet.

At 1006, the compatible packet can be transmitted from the IM to the memory sub-component via the communication link and associated CM. The compatible packet can be switched in to the memory sub-component via the communication link (e.g., ICL), wherein the compatible packet can be sent from the output port of the IM to the input port of the CM in the first set of CMs of the switch component using the communication link, and the compatible packet can be transmitted from an output port of the CM to the memory sub-component via another communication link between the CM and the memory sub-component. The compatible packet can be stored in the memory sub-component until its assigned departure time.

At 1008, at the assigned departure time of the compatible packet, the compatible packet can be read from the memory sub-component to facilitate providing the compatible packet as an output from the switch component. During the second switching phase, the memory sub-component or another component(s) (e.g., switch management component, CM of the second set of CMs, OM, etc.) of the switch component can switch out the compatible packet from the memory sub-component and provide it as an output. The compatible packet can be transmitted from the memory sub-component to an associated input port of a CM of the second set of CMs via a communication link between the memory sub-component and the input port of that CM. The compatible packet can be sent from an output port of that CM to an input port of the OM, and the OM can transmit the compatible packet from an output port of the OM to provide the compatible packet as an output.

In accordance with the method 1000, if any unmatched memory sub-component remains after a round of memory sub-components and packets attempting to match to facilitate scheduling of the packets by the switch component, the method 1000 can continue to perform one or more other rounds to facilitate matching unmatched memory sub-components with compatible packets received by the input component of the switch component.

In accordance with various other implementations and embodiments, the method 1000 can be modified to employ a defined modified scheduling algorithm to facilitate scheduling and dispatching packets by a switch component (e.g., MMS-SSB switch) to facilitate enabling the switch component to emulate a PIFO-OQ switch.

FIG. 11 depicts a flowchart of another example method 1100 that can facilitate processing (e.g., scheduling, switching, communicating, routing, etc.) packets of information based at least in part on a defined scheduling algorithm (e.g., an RGRG algorithm), in accordance with various aspects and embodiments of the disclosed subject matter. The method 1100 can be employed, for example, by a switch component (e.g., MMS-SSB switch). The switch component can perform all or a desired portion of the operations of the method 1100 in accordance with the defined scheduling algorithm. The switch component can perform a first switching phase and a second switching phase to process packets received by the switch component and provide these packets as an output, wherein the first switching phase can involve receiving the packets by the switch component and dispatching these packets to respective memory sub-components, and the second switching phase can involve the reading or switching out of these packets from the respective memory sub-components to provide these packets as an output from the output ports of the OMs of the output component of the switch component.

At 1102, one or more packets can be received by the switch component. The switch component can receive one or more packets in relation to communicating packets of information in a communication network.

At 1104, an unmatched ICL associated with a CM of the switch component can be selected (e.g., randomly selected) for an unmatched memory sub-component of a memory component of the switch component, wherein the memory sub-component is linked to the CM. With regard to each unmatched memory sub-component of the memory component, an unmatched memory sub-component or a switch management component of the switch component can select the unmatched ICL for the unmatched memory sub-component. In accordance with various implementations, the unmatched ICL can be selected randomly (e.g. using a random number generator that can generate a random number that can facilitate random selection of the unmatched ICL) or the unmatched ICL can be selected using another defined selection technique (e.g., a round-robin selection technique).

At 1106, a request for the unmatched ICL can be transmitted, for example, to the unmatched ICL. In some implementations, for each unmatched memory sub-component, the unmatched memory sub-component can transmit the request to the unmatched ICL, for example, to request to use the unmatched ICL to facilitate matching the memory sub-component with a packet (e.g., a compatible packet) received by the switch component. Each unmatched ICL can receive one or more requests from one or more unmatched memory sub-components.

At 1108, a grant of the request by or in relation to (e.g., in connection with) the unmatched ICL can be received. For each unmatched memory sub-component, the unmatched memory sub-component or an associated component (e.g., the switch management component) can receive the grant of the request for use of the unmatched ICL from the unmatched ICL. The unmatched ICL or an associated component (e.g., the switch management component) can select the unmatched memory sub-component from the one or more memory sub-components that sent requests for use of the unmatched ICL to the unmatched ICL. In accordance with various implementations, the unmatched ICL or the associated component (e.g., the switch management component) can select the memory sub-component randomly (e.g. using a random number generator that can generate a random number that can facilitate random selection of the unmatched memory sub-component), or can select the unmatched memory sub-component from the one or more unmatched memory sub-components using another defined selection technique (e.g., a round-robin selection technique).

At 1110, a request to match with a compatible packet can be transmitted, using the ICL, to a compatible packet that is stored in the IM of the switch component that is linked to the ICL, in response to the grant being received from the unmatched ICL. For each unmatched memory sub-component, the unmatched memory sub-component (or a switch management component associated therewith) can transmit the request to match with a compatible packet (e.g., the match request), to the compatible packet (or to the switch sub-component of the IM wherein the compatible packet is stored or its associated switch management component) via the ICL that granted the request for use of the ICL, wherein the compatible packet is stored in switch sub-component of the IM that is linked to the ICL. In accordance with various implementations, the unmatched memory sub-component (or a switch management component associated therewith) can transmit the request for a compatible packet randomly (e.g. using a random number generator that can generate a random number that can facilitate random selection of a compatible packet to which to send the request), or the unmatched memory sub-component (or a switch management component associated therewith) can use another defined selection technique (e.g., a round-robin selection technique) to facilitate determining or selecting a compatible packet to which to send the request. The compatible packet, if any, or an associated component (e.g., the switch sub-component of the IM or a switch management component) can receive the request for a compatible packet from the unmatched memory sub-component (or a switch management component associated therewith) and/or can receive a request(s) for a compatible packet from one or more other unmatched memory sub-component(s) (or a switch management component(s) associated therewith). If there is no compatible packet available for the unmatched memory sub-component, the unmatched memory sub-component can do nothing at that time.

At 1112, a grant can be received by the unmatched memory sub-component (or an associated switch management component) from the compatible packet (or an associated switch management component). For respective unmatched memory sub-components and respective compatible packets, the compatible packet (or an associated switch sub-component of the IM or a switch management component) can select the unmatched memory sub-component from one or more requests received from one or more unmatched memory sub-components, including the unmatched memory sub-component. In accordance with various implementations, the compatible packet (or a switch sub-component or a switch management component associated therewith) can select the unmatched memory sub-component from the one or more memory sub-components randomly (e.g. using a random number generator that can generate a random number that can facilitate random selection of the memory sub-component to which to send the grant message), or the compatible packet (or a switch sub-component or a switch management component associated therewith) can use another defined selection technique (e.g., a round-robin selection technique) to facilitate determining or selecting an unmatched memory sub-component (e.g., the unmatched memory sub-component) to which to send the grant message. In response to receiving the grant message, the unmatched memory sub-component can be matched with the compatible packet to facilitate transmission of the compatible packet to the now-matched memory sub-component.

At 1114, the compatible packet can be transmitted from the IM to the memory sub-component via the ICL and associated CM (e.g., the input of the CM in the first set of CMs). For the respective memory sub-components (e.g., now-matched memory sub-components) and the respective compatible packets, the switch component can transmit the compatible packet from the output port of the IM to the memory sub-component via the ICL, which can be associated with an input port of a switch (e.g., switch sub-component) of the CM (e.g., the CM of the first set of CMs of the central component of the switch component) that can have an output port that can be associated with (e.g., communicatively linked or connected to) the memory sub-component.

The memory sub-component can store (e.g., buffer) the compatible packet until the compatible packet is scheduled for departure from the switch component based at least in part on the departure time associated with the compatible packet. The switch component (e.g., a switch management component or other component of the switch component) can assign a departure time to the compatible packet at or near the time the compatible packet is received by the IM of the input component of the switch component. The departure time can be based at least in part on the order of receipt of the compatible packet by the switch component in relation to other packets and/or another desired factor (e.g., priority of the compatible packet relative to the priorities of other packets).

At 1116, the compatible packet can be provided as an output from the switch component in accordance with the departure time associated with the compatible packet. The memory sub-component can be associated with an OM of the second set of CMs of the switch component (e.g., can be associated with (e.g., communicatively linked to) a switch sub-component of the OM of the second set). At the assigned departure time for the compatible packet, the memory sub-component (or the switch management component associated therewith) can facilitate providing (e.g., reading out, switching out, transmitting, etc.) the compatible packet from the memory sub-component via the communication link between the memory sub-component and the CM of the second set and via a communication link between the CM and the OM of the switch component. The OM (e.g., a switch sub-component of the OM) can provide the compatible packet as an output at the assigned departure time.

In accordance with the method 1100, if any unmatched memory sub-component remains after a round of memory sub-components and packets attempting to match to facilitate scheduling of the packets by the switch component, the method 1100 can continue to perform one or more other rounds to facilitate matching unmatched memory sub-components with compatible packets received by the input component of the switch component.

FIG. 12 illustrates a flowchart of an example method 1200 that can facilitate processing (e.g., scheduling, switching, communicating, routing, etc.) packets of information based at least in part on a defined scheduling algorithm (e.g., a modified scheduling algorithm that can be based in part on the RGRG algorithm), in accordance with various aspects and embodiments of the disclosed subject matter. The method 1200 can be employed, for example, by a switch component (e.g., MMS-SSB switch). The switch component can perform all or a desired portion of the operations of the method 1200 in accordance with the defined scheduling algorithm, wherein there can be a first switching phase for receiving the packets by the switch component and dispatching these packets to respective memory sub-components, and a second switching phase for switching out these packets from the respective memory sub-components to provide these packets as an output from the output ports of the OMs of the output component of the switch component.

With regard to various aspects of the method 1200, to satisfy potential memory and link contentions, and applicable QoS standards (e.g., QoS requirements), when dispatching packets, the method 1200 determines or identifies a packet that is compatible—e.g., a compatible packet—with a memory sub-component in relation to dispatching the packet into the memory sub-component and switching out the packet from the memory sub-component for output from the switch component. A packet received by the switch component initially can have a departure time t assigned to it, although the departure time of the packet may change at a later time due in part to the PIFO discipline associated with the switch component. A packet can be a compatible packet with the unmatched memory sub-component if the disclosed set (e.g., 3) of rules associated with the defined modified scheduling algorithm is satisfied.

Initially, the compatibility of a packet may not be known when the packet is being dispatched into a memory sub-component due in part to the potential for the departure time of the packet to change from its initially assigned departure time. When a packet is being dispatched into the memory sub-component during the first switching phase, a packet can be "first-switching-phase compatible" (e.g., sufficiently compatible for the first switching phase) if the packet satisfies the first two rules of the set of rules, (1) the memory sub-component is not about to be written by another arriving packet(s) in the same time as the packet, and (2) the ICL through which the packet is about to traverse is not occupied by another arriving packet(s) in the same time. During the second switching phase, the switch component can configure switching connections associated with the CMs (e.g., the second set of CMs) and can switch out the packet from the memory sub-component via the CM and OM (which can comprise input buffer components) to provide the packet as an output with a defined period of time of the applicable (e.g. initial or modified) departure time associated with the packet to thereby render a "first-switching-phase compatible" packet stored in a memory sub-component a compatible packet, in accordance with the third rule of the set of rules, with the third rule being that the memory sub-component has no other packet(s), which is destined for the output port of the OM being used by the compatible packet, that bears the a departure time within the defined period of time (e.g., within the time interval (t−N, t) and (t, t+N)).

With further regard to the method 1200, at 1202, one or more packets can be received by the switch component. The switch component can receive one or more packets in relation to communicating packets of information in a communication network.

At 1204, an unmatched ICL associated with a CM of the switch component can be selected (e.g., randomly selected, or selected using another selection technique) for an unmatched memory sub-component of a memory component of the switch component, wherein the memory sub-component is linked to the CM. With regard to each unmatched memory sub-component of the memory component, an unmatched memory sub-component or a switch management component of the switch component can select the unmatched ICL for the unmatched memory sub-component.

At 1206, a request for use of the unmatched ICL can be transmitted, for example, to the unmatched ICL. In some implementations, for each unmatched memory sub-component, the unmatched memory sub-component can transmit the request to the unmatched ICL, for example, to request to use the unmatched ICL to facilitate matching the unmatched memory sub-component with a packet (e.g., a compatible packet) received by the switch component. Each unmatched ICL can receive one or more requests from one or more unmatched memory sub-components.

At 1208, a grant of the request by (or on behalf of) the unmatched ICL can be received (e.g., by the unmatched memory sub-component). For each unmatched memory sub-component, the unmatched memory sub-component or an associated component (e.g., the switch management component) can receive the grant of the request for use of the unmatched ICL from the unmatched ICL (or an associated component). The unmatched ICL or an associated component (e.g., the switch management component) can select (e.g., randomly select, or select using another selection technique, such as a round-robin selection technique) the unmatched memory sub-component from the one or more memory sub-components that sent requests for use of the unmatched ICL to the unmatched ICL.

At 1210, a request for a compatible packet can be transmitted, using the ICL, to a compatible packet that is stored in the IM of the switch component that is linked to the ICL, in response to the grant being received from the ICL (e.g., the formerly unmatched ICL). For each unmatched memory sub-component, the unmatched memory sub-component (or a switch management component associated therewith) can transmit the request to match with a compatible packet to the compatible packet (or an associated switch sub-component of the IM wherein the packet is stored or a switch management component) via the ICL that granted the request for use of the ICL, wherein the compatible packet is stored in the switch sub-component of the IM that is linked to the ICL. In accordance with various implementations, the unmatched memory sub-component (or a switch management component associated therewith) can transmit the request for a compatible packet based in part on a random selection of a compatible packet or on another defined selection technique (e.g., a round-robin selection technique) to facilitate determining or selecting a compatible packet to which to send the request.

The compatible packet, if any, or an associated component (e.g., the associated switch sub-component or switch management component) can receive the request for a compatible packet from the unmatched memory sub-component (or a switch management component associated therewith) and/or can receive a request(s) for a compatible packet from one or more other unmatched memory sub-component(s) (or a switch management component(s) associated therewith). If there is no compatible packet available for the unmatched memory sub-component, the unmatched memory sub-component can do nothing at that time.

At 1212, a grant can be received by the unmatched memory sub-component (or an associated switch management component on behalf of the unmatched memory sub-component) from the compatible packet (or an associated switch sub-component or switch management component). For respective unmatched memory sub-components and respective compatible packets, the compatible packet (or an associated switch sub-component or switch management component) can select (e.g., randomly select or select via another defined selection technique) the unmatched memory sub-component from one or more requests received from one or more unmatched memory sub-components, including the unmatched memory sub-component. In response to receiving the grant message, the unmatched memory sub-component can be matched with the compatible packet to facilitate transmission of the compatible packet to the now-matched memory sub-component.

At 1214, the compatible packet can be transmitted from the IM to the memory sub-component via the ICL and associated CM of the first set of CMs. For the respective memory sub-components (e.g., now-matched memory sub-components) and the respective compatible packets, the switch component can transmit the compatible packet from the output port of the IM to the memory sub-component via the ICL, which can be associated with an input port of a switch (e.g., switch sub-component) of the CM (e.g., the CM of the first set of CMs of the central component of the switch component) that can have an output port that is associated with (e.g., communicatively linked or connected to) the memory sub-component.

In accordance with the method 1200, if any unmatched memory sub-component remains after a round of memory sub-components and packets attempting to match to facilitate scheduling of the packets by the switch component, the method 1200 can continue to perform one or more other rounds to facilitate matching unmatched memory sub-components with compatible packets received by the input component of the switch component.

At 1216, a configuration for the switch connections of the CMs (e.g., of the second set of CMs) of the central component of the switch component can be determined. The switch management component or another component (e.g., the central component (e.g., the second set of CMs of the central component) of the switch component can determine a configuration for the switch connections (e.g., layer switch connections) of the CMs of the second set of CMs based at least in part on patterns obtained from a defined matrix decomposition applied to a request traffic matrix, which can be a k×k doubly substochastic matrix, wherein the request traffic matrix can be representative of a request graph that can correspond to the second set of CMs. The switch management component or other component of the switch component can generate the request graph and/or request traffic matrix, and can use a defined matrix decomposition method to perform a defined matrix decomposition on the request traffic matrix to determine or generate a series of connection patterns, which can be, or can be used as a representation of, switch connection patterns that can be used to determine the switch connections of the CMs for use during the second switching phase of the switch component to facilitate switching out the packets.

At 1218, the switch connections of the CMs (e.g., of the second set of CMs) can be configured based at least in part on the determination of the configuration for the switch connections of the CMs. The switch management component or other component (e.g., the central component) of the switch component can facilitate configuring the switch connections associated with the second set of CMs (e.g., the switch or communication connections or links between the input ports of the CMs of the second set of CMs and the output ports of the CMs of the second set of CMs) based at least in part on the determination of the configuration for the switch connections of the CMs, which can be based at least in part on the series of connection patterns derived as disclosed herein.

At 1220, the packets stored in the respective memory sub-components of the memory component can be switched out (e.g., read out) from the respective memory sub-components and provided to respective input buffer components of the OMs via the switch connections of the CMs (e.g., second set of CMs) at the respective departure times of the packets. At the respective departure times of the respective packets stored in the memory sub-components, the switch management component or other component(s) (e.g., the central component) of the switch component can switch out the packets from the respective memory sub-components and transmit those packets to respective inputs of the second set of CMs via corresponding communication connections between the memory sub-components and the respective input ports of the second set of CMs. The second set of CMs process or switch out the packets from the output ports of the CM via the configured switch connections, and can communicate the packets to the respective input buffer components of the OMs via the respective communication connections (e.g., CM-OM links (COLs)) between the output ports of the second set of CMs and the input ports of the OMs and associated input buffer components. The packets can be stored in the respective input buffer components for up to the defined period of time associated with (e.g., based at least in part on) the respective departure times of the packets, wherein the defined period of time for a packet departure can be related to an acceptable amount of delay (e.g., an acceptable constant amount of delay) from the packet's assigned departure time in dispatching the packet from the switch component that can meet the desired (e.g., applicable) QoS standard. An input buffer component of the OMs can store one or more packets received from one or more CMs of the second set of CMs.

At 1222, the packets can be switched out from the OMs within a defined period of time of the respective departure times of the packets to provide the packets as an output from the switch component. Within the defined period of time (e.g., defined time interval) of the respective departure times of the respective packets stored in the memory sub-components, the OMs can switch out (e.g., read out, dispatch, etc.) the respective packets stored in the respective input buffer components via the output ports of the respective OMs, and can provide the respective packets as an output.

Figure 13:
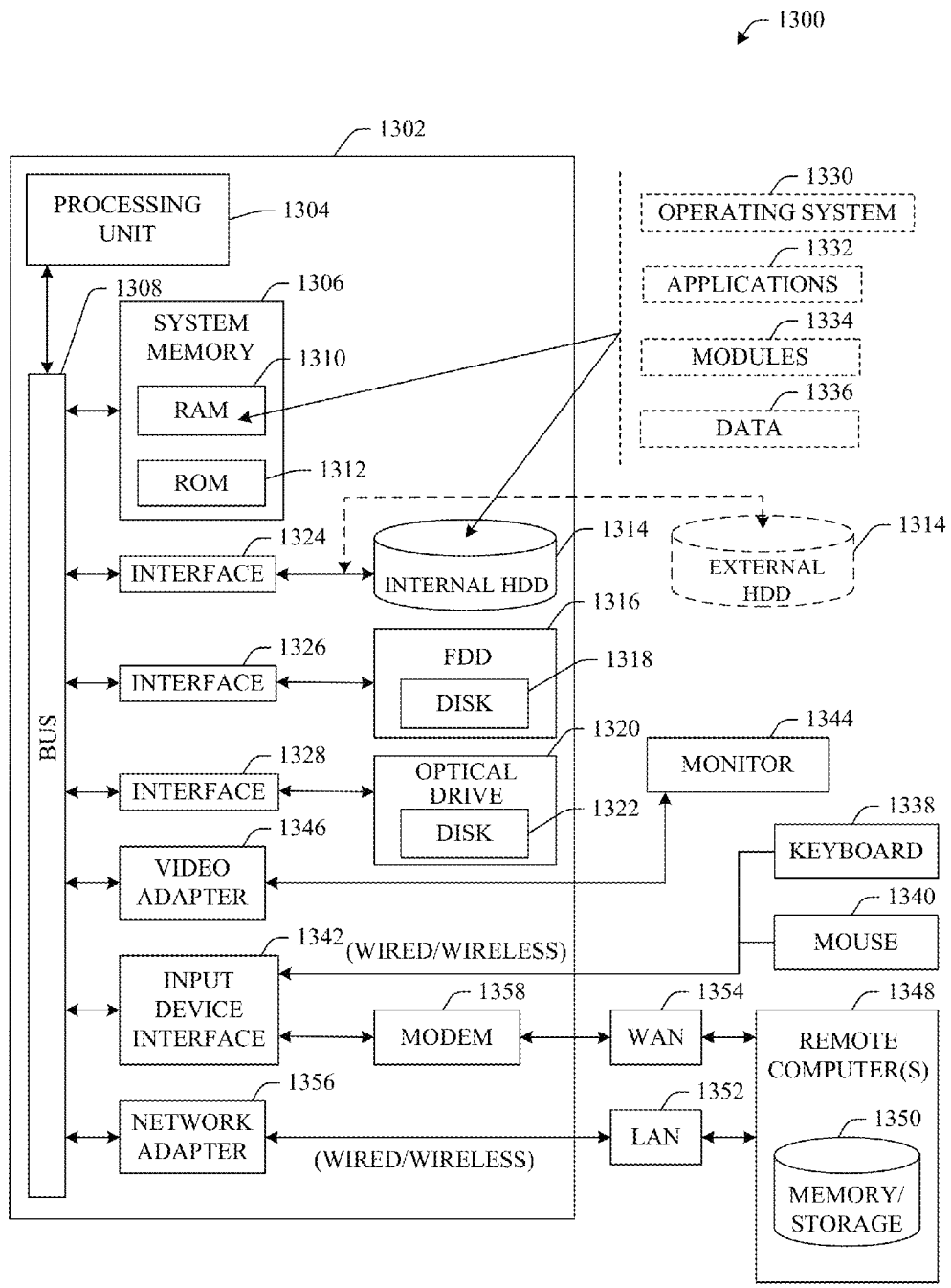
FIG. 13 is a schematic block diagram illustrating a suitable operating environment.

Referring now to FIG. 13, there is illustrated a block diagram of an exemplary computer system operable to execute aspects of the disclosed subject matter. In order to provide additional context for various aspects of the various embodiments, FIG. 13 and the following discussion are intended to provide a brief, general description of a suitable computing environment 1300 in which the various aspects of the various embodiments can be implemented. Additionally, while the various embodiments described above may be suitable for application in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 13, the exemplary environment 1300 for implementing various aspects of one or more of the various embodiments includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the various embodiments.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the various embodiments can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi™ and Bluetooth™ wireless technologies. Thus, the communication can be a predefined structure as with a conventional network or simply an ad hoc communication between at least two devices.

Wi-Fi™, or Wireless Fidelity, allows connection to the Internet from a couch at home, a bed in a hotel room, or a conference room at work, without wires. Wi-Fi™ is a wireless technology similar to that used in a cell phone that enables such devices, e.g., computers, to send and receive data indoors and out; anywhere within the range of a base station. Wi-Fi™ networks use radio technologies called IEEE 802.11(a, b, g, n, etc.) to provide secure, reliable, fast wireless connectivity. A Wi-Fi™ network can be used to connect computers to each other, to the Internet, and to wired networks (which use IEEE 802.3 or Ethernet). Wi-Fi™ networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
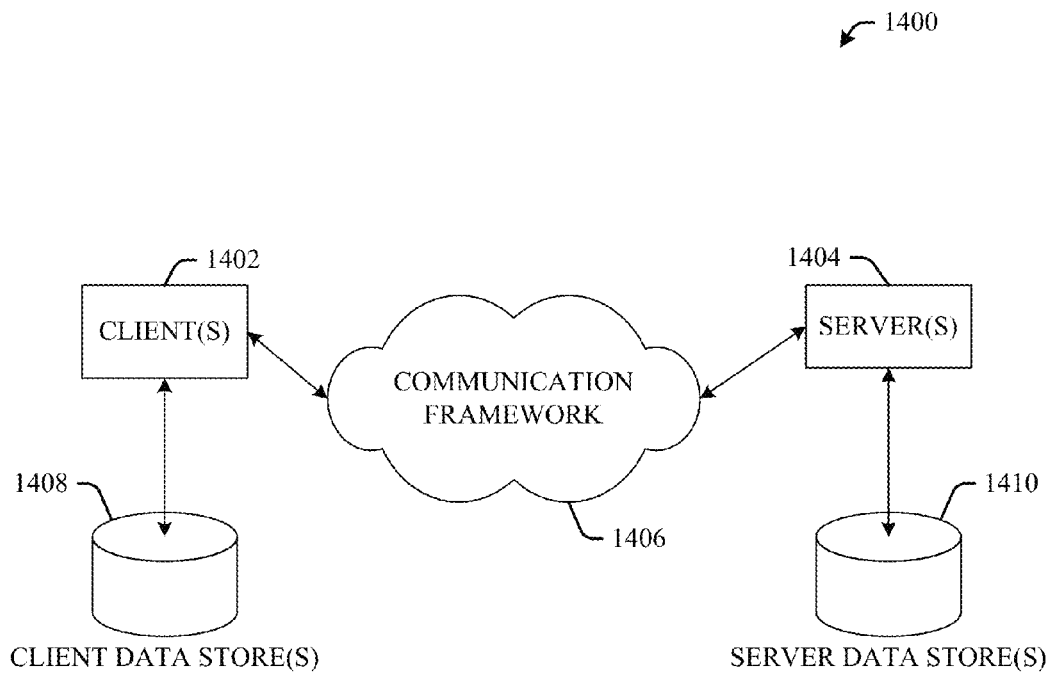
FIG. 14 is a schematic block diagram of a sample-computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware and/or software (e.g., threads, processes, computing devices). The client(s) 1402 can house cookie(s) and/or associated contextual information by employing the various embodiments, for example.

The system 1400 also includes one or more server(s) 1404. The server(s) 1404 can also be hardware and/or software (e.g., threads, processes, computing devices). The servers 1404 can house threads to perform transformations by employing the various embodiments, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

It is to be appreciated and understood that components (e.g., switch component, input component, IM, central component, CM, memory component, memory sub-component, output component, OM, switch management component, processor component, data store, router, etc.), as described with regard to a particular system or method, can include the same or similar functionality as respective components (e.g., respectively named components) as described with regard to other systems or methods disclosed herein.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising", such as, for example, as the term "comprising" is interpreted when employed as a transitional word in a claim.

What is claimed is:

1. A system, comprising:
a memory to store computer-executable components; and
a processor, coupled to the memory, that executes or facilitates execution of at least one of the computer-executable components, the computer-executable components comprising:
a switch component that comprises multiple stages of switches and intermediate-stage shared buffering of packets of information to facilitate communication of the packets in a communication network, wherein the switch component comprises an input component comprising a set of input switches associated with an input stage of the multiple stages, an intermediate component comprising a set of switches associated with an intermediate stage of the multiple stages, and an output component comprising a set of output switches associated with an output stage of the multiple stages; and
a memory component that comprises a set of memory sub-components and is associated with the intermediate component of the intermediate stage, wherein memory sub-components of the set of memory sub-components are shared with the set of input switches of the input component and the set of output switches of the output component to facilitate buffering of the packets via the intermediate-stage shared buffering and scheduling of the packets for output from the switch component, wherein an unmatched memory sub-component of the set of memory sub-components selects an unmatched communication link of a set of unmatched communication links associated with an intermediate module of a first set of intermediate modules that is linked to the unmatched memory sub-component, and sends a request for use of the unmatched communication link to the unmatched communication link, in accordance with a defined scheduling criterion.

2. The system of claim 1, wherein the memory component is interposed between the first set of intermediate modules of the intermediate component and a second set of intermediate modules of the intermediate component, wherein the first set of intermediate modules comprises a first subset of switches associated with input modules of the input component and the second set of intermediate modules comprises a second subset of switches associated with output modules of the output component.

3. The system of claim 2, wherein the unmatched memory sub-component of the set of memory sub-components randomly selects the unmatched communication link of the set of unmatched communication links, in accordance with the defined scheduling criterion.

4. The system of claim 1, wherein, in response to receipt of one or more requests for use of the unmatched communication link, comprising the request for use of the unmatched communication link, the unmatched communication link selects the unmatched memory sub-component and sends a grant message to the unmatched memory sub-component, in accordance with the defined scheduling criterion.

5. The system of claim 4, wherein, in response to the grant message, the unmatched communication link is rendered to be a matched communication link, and the unmatched memory sub-component sends a match request to a compatible packet of information of the packets of information via the matched communication link, in accordance with the defined scheduling criterion.

6. The system of claim 5, wherein, in response to receipt of one or more match requests, comprising the match request from the unmatched memory sub-component, the compatible packet selects the unmatched memory sub-component and sends a second grant message to the unmatched memory sub-component, in accordance with the defined scheduling criterion, to facilitate a match between the compatible packet and the unmatched memory sub-component to render the unmatched memory sub-component to be a matched memory sub-component, and the compatible packet is communicated from the input component to the matched memory sub-component via the matched communication link for storage in the matched memory sub-component.

7. The system of claim 6, wherein the switch component reads the compatible packet from the matched memory sub-component in connection with a departure time associated with the compatible packet, and the compatible packet is transmitted as an output from the switch component via another intermediate module of a second set of intermediate modules and an output module of the output component that is associated with the intermediate module.

8. The system of claim 6, wherein the output module of the output component comprises an input buffer component that is associated with an output switch of the set of output switches of the output component, and wherein the switch component reads the compatible packet from the matched memory sub-component in connection with a departure time associated with the compatible packet, and the compatible packet is transmitted to the input buffer component via a second switch in the other intermediate module of a second set of intermediate modules to facilitate storage of the compatible packet in the input buffer component for a defined period of time based at least in part on a defined period of time delay in connection with the departure time, in accordance with the defined scheduling criterion.

9. The system of claim 8, wherein the switch component reads the compatible packet from the input buffer component based at least in part on the defined period of time delay, and the compatible packet is transmitted as an output from the switch component via the output switch of the output component that is associated with the other intermediate module within the defined period of time delay from the departure time.

10. The system of claim 2, wherein the set of memory sub-components, communication links associated with intermediate modules of the first set of intermediate modules, and the packets operate in parallel to facilitate matching the packets with respective memory sub-components of the set of memory sub-components to facilitate the scheduling of the packets for output from the switch component.

11. The system of claim 10, wherein the switch component updates compatibility information relating to the matching of the packets with the respective memory sub-components in response to completion of a round of the matching of the packets with the respective memory sub-components.

12. The system of claim 11, wherein the switch component determines whether there exists one or more remaining packets of the packets of information that remain unmatched with unmatched memory sub-components of the set of memory sub-components based at least in part on the compatibility information, and, in response to determining that there exists one or more remaining packets that remain unmatched, the switch component performs another round of the matching to facilitate matching the one or more remaining packets with the respective memory sub-components.

13. A method, comprising:
receiving, by a system comprising a processor, a plurality of packets of traffic at an input component comprising a plurality of input switches and associated with an input stage of a multi-stage switch component;
for an unmatched buffer memory of a plurality of buffer memories, determining, by the system, an unmatched communication link of a plurality of unmatched communication links to use as a communication link by the unmatched buffer memory, wherein the unmatched communication link is associated with a first intermediate module of an intermediate component that is associated with the unmatched buffer memory;
transmitting, by the system, a request to use of the unmatched communication link by the unmatched buffer memory to the unmatched communication link, in accordance with a set of defined packet scheduling criteria, wherein, in response to granting of the request to use, the unmatched communication link is the communication link usable by a buffer memory that had been the unmatched buffer memory prior to the granting of the request for use;
transmitting, by the system, a packet of the plurality of packets from an input switch of the input component to the buffer memory of the plurality of buffer memories in an intermediate-stage shared buffer memory component via the communication link and a first switch of the first intermediate module of the intermediate component, based at least in part on a matching of the buffer memory with the packet in accordance with the set of defined packet scheduling criteria, to facilitate buffering the packet in connection with a departure time associated with the packet, wherein the intermediate-stage shared buffer memory component and the intermediate component are associated with an intermediate stage of the multi-stage switch component; and
transmitting, by the system, the packet from the buffer memory to an output switch of a plurality of output switches of an output component via a second switch of a second intermediate module of the intermediate component to facilitate providing the packet as an output from the multi-stage switch component based at least in part on the departure time associated with the packet, wherein the output component is associated with an output stage of the multi-stage switch component.

14. The method of claim 13, further comprising:
facilitating buffering, by the system, of the packets using the plurality of buffer memories in the intermediate-stage shared buffer memory component to facilitate scheduling of the packets for output from the multi-stage switch component by sharing the plurality of buffer memories with the plurality of input switches of the input component and the plurality of output switches of the output component.

15. The method of claim 13, further comprising:
selecting, by the system, the communication link of a plurality of communication links associated with the first intermediate module of a first set of intermediate modules that is linked to the buffer memory that is initially unmatched with respect to the communication link and the packets of traffic.

16. The method of claim 13, further comprising:
in response to receiving one or more requests for use of the unmatched communication link, comprising the request for use of the unmatched communication link, selecting, by the system, the unmatched buffer memory as the buffer memory; and
transmitting, by the system, a grant message to the buffer memory, in accordance with the set of defined packet scheduling criteria, wherein the communication link becomes matched with the buffer memory.

17. The method of claim 16, further comprising:
transmitting, by the system, a match request to the packet via the communication link, wherein the packet is compatible with the buffer memory in accordance with the set of defined packet scheduling criteria.

18. The method of claim 17, further comprising:
in response to receiving one or more match requests, comprising the match request from the buffer memory, selecting, by the system, the buffer memory; and
transmitting, by the system, a second grant message to the buffer memory, in accordance with the set of defined packet scheduling criteria, to facilitate the matching of the buffer memory with the packet and the transmitting of the packet to the buffer memory.

19. The method of claim 18, further comprising:
reading, by the system, the packet from the buffer memory in connection with a departure time associated with the compatible packet to facilitate the providing of the packet as the output from the multi-stage switch component based at least in part on the departure time associated with the packet.

20. The method of claim 18, further comprising:
reading, by the system, the packet from the buffer memory in connection with the departure time associated with the packet; and
storing, by the system, the packet in an input buffer component that is associated with the output switch of the plurality of output switches of the output component to facilitate buffering the packet in the input buffer component for a defined period of time based at least in part on a defined period of time delay in connection with the departure time associated with the packet, in accordance with the set of defined scheduling criteria, to facilitate the providing of the packet as the output from the multi-stage switch component based at least in part on the departure time associated with the packet and the defined period of time delay.

21. The method of claim 13, further comprising:
performing, by the system, a multiple request and grant process in parallel, in accordance with the set of defined scheduling criteria, to facilitate matching packets of the packets of traffic with respective buffer memories of the plurality of buffer memories to facilitate scheduling of the packets for output from the multi-stage switch component.

22. The method of claim 21, further comprising:
in response to completion of a round of the matching of the packets with the respective buffer memories, updating, by the system, compatibility information relating to the matching of the packets with the respective buffer memories;
determining, by the system, whether there exists one or more remaining packets of the packets of traffic that remain unmatched with one or more unmatched buffer memories of the plurality of buffer memories based at least in part on the compatibility information; and in response to determining that there exists one or more remaining packets that remain unmatched with one or more unmatched buffer memories, performing another round of the matching to facilitate matching the one or more remaining packets with the one or more unmatched buffer memories.

23. A system, comprising:

means for receiving a set of packets of traffic at an input component comprising a set of input switches and associated with an input stage of a multi-stage switch component;

with respect to an unmatched buffer memory sub-component of a set of buffer memory sub-components, means for selecting an unmatched communication link of a set of unmatched communication links to use as a communication link by the unmatched buffer memory sub-component, wherein the unmatched communication link is associated with a first intermediate module of an intermediate component that is associated with the unmatched buffer memory sub-component;

means for transmitting a request to use of the unmatched communication link by the unmatched buffer memory sub-component to the unmatched communication link, in accordance with a set of defined packet scheduling criteria, wherein, in response to granting of the request to use, the unmatched communication link is the communication link usable by a buffer memory sub-component that had been the unmatched buffer memory sub-component prior to the granting of the request for use;

means for transmitting a packet of the set of packets from an input switch of the input component to the buffer memory sub-component of the set of buffer memory sub-components in an intermediate-stage shared buffer memory component via the communication link and a first switch of the first intermediate module of the intermediate component, based at least in part on a matching of the buffer memory sub-component with the packet in accordance with the set of defined packet scheduling criteria, to facilitate buffering the packet in connection with a departure time associated with the packet, wherein the intermediate-stage shared buffer memory component and the intermediate component are associated with an intermediate stage of the multi-stage switch component; and means for transmitting the packet from the buffer memory sub-component to an output switch of a plurality of output switches of an output component via a second switch of a second intermediate module of the intermediate component to facilitate providing the packet as an output from the multi-stage switch component based at least in part on the departure time associated with the packet, wherein the output component is associated with an output stage of the multi-stage switch component.

24. The system of claim 23, further comprising:

means for facilitating buffering of packets of the plurality of packets for respective defined periods of time using the set of buffer memory sub-components in the intermediate-stage shared buffer memory component to facilitate scheduling of the packets for output from the multi-stage switch component by sharing the set of buffer memory sub-components with the set of switches of the input component and the set of switches of the output component, wherein the packets are buffered for the respective defined periods of time in connection with respective departure times associated with the packets.

25. A non-transitory computer-readable medium storing instructions that, in response to execution, cause a system comprising a processor to perform operations, comprising:

receiving a plurality of packets of information at an input component comprising a plurality of switches and associated with an input stage of a multi-stage switch component;

for an unmatched buffer memory of a plurality of buffer memories, determining an unmatched communication link of a plurality of unmatched communication links to use as a communication link by the unmatched buffer memory, wherein the unmatched communication link is associated with a first intermediate module of an intermediate component that is associated with the unmatched buffer memory;

transmitting a request to use the unmatched communication link by the unmatched buffer memory to the unmatched communication link, in accordance with a set of defined packet scheduling criteria, wherein, in response to granting of the request to use, the unmatched communication link is the communication link usable by a buffer memory that had been the unmatched buffer memory prior to the granting of the request for use;

transmitting a packet of the plurality of packets from an input switch of the input component to the buffer memory of the plurality of buffer memories in an intermediate-stage shared buffer memory component via the communication link and a first switch of the first intermediate module, based at least in part on a matching of the buffer memory with the packet in accordance with the set of defined packet scheduling criteria, to facilitate buffering the packet in connection with a departure time associated with the packet, wherein the intermediate-stage shared buffer memory component and the intermediate component are associated with an intermediate stage of the multi-stage switch component; and transmitting the packet from the buffer memory to an output switch of a plurality of output switches of an output component via a second switch of a second intermediate module of the intermediate component to facilitate providing the packet as an output from the multi-stage switch component based at least in part on the departure time associated with the packet, wherein the output component is associated with an output stage of the multi-stage switch component.

26. The non-transitory computer-readable medium of claim 25, wherein the operations further comprise:

facilitating buffering of packets of the plurality of packets for respective defined periods of time using the plurality of buffer memories in the intermediate-stage shared buffer memory component to facilitate scheduling of the packets for output from the multi-stage switch component by sharing the plurality of buffer memories with the plurality of switches of the input component and the plurality of switches of the output component, wherein the packets are buffered for the respective defined periods of time in connection with respective departure times associated with the packets.

* * * * *